United States Patent [19]
Labedz et al.

[11] Patent Number: 4,654,867
[45] Date of Patent: Mar. 31, 1987

[54] CELLULAR VOICE AND DATA RADIOTELEPHONE SYSTEM

[75] Inventors: Gerald P. Labedz, Chicago; Jeffrey D. Bonta, Mount Prospect; Dennis R. Schaeffer, Buffalo Grove; Daniel F. Tell, Deerfield, all of Ill.

[73] Assignee: Motorola, Inc., Schaumburg, Ill.

[21] Appl. No.: 894,387

[22] Filed: Aug. 11, 1986

Related U.S. Application Data

[63] Continuation of Ser. No. 630,481, Jul. 13, 1984, abandoned.

[51] Int. Cl.$^4$ .............................................. H01Q 7/04
[52] U.S. Cl. ........................................ 379/59; 455/54; 455/33; 379/60; 379/56; 379/91
[58] Field of Search ................. 179/2 E, 2 EA, 2 EB, 179/2 DP; 455/33, 54

[56] References Cited

U.S. PATENT DOCUMENTS

| | | |
|---|---|---|
| 3,663,762 | 5/1972 | Joel, Jr. . |
| 3,764,915 | 10/1973 | Cox et al. . |
| 3,819,872 | 6/1974 | Hamrick . |
| 3,860,872 | 1/1975 | Richardson et al. . |
| 3,906,166 | 9/1975 | Cooper et al. . |
| 3,920,918 | 11/1975 | Thomas . |
| 4,025,853 | 5/1977 | Addeo . |
| 4,029,900 | 6/1977 | Addeo . |
| 4,032,846 | 6/1977 | Hirade et al. . |
| 4,128,740 | 12/1978 | Graziano . |
| 4,144,411 | 3/1979 | Frenkiel . |
| 4,144,496 | 3/1979 | Cunningham . |
| 4,163,121 | 7/1979 | Yoshikawa et al. . |
| 4,242,538 | 12/1980 | Ito et al. . |
| 4,301,531 | 11/1981 | Lubin . |
| 4,310,722 | 1/1982 | Schaible . |
| 4,312,070 | 1/1982 | Coombes et al. ................ 371/40 |
| 4,320,523 | 3/1982 | Horikawa et al. . |
| 4,352,955 | 10/1982 | Kai et al. ........................ 179/2 EB |
| 4,355,411 | 10/1982 | Reudink et al. . |
| 4,356,484 | 10/1982 | Eckhardt ..................... 340/825.03 |
| 4,363,935 | 12/1982 | Toya . |
| 4,383,332 | 5/1983 | Glance et al. . |
| 4,384,362 | 5/1983 | Leland . |
| 4,385,381 | 5/1983 | Alexis . |
| 4,394,757 | 7/1983 | Muzumdar et al. ............... 370/100 |
| 4,398,063 | 8/1983 | Hass et al. . |
| 4,399,555 | 8/1983 | MacDonald et al. . |
| 4,414,661 | 11/1983 | Karlstrom ......................... 370/95 |
| 4,425,661 | 1/1984 | Moses et al. . |
| 4,439,763 | 3/1984 | Limb . |
| 4,475,010 | 10/1984 | Huensch et al. ............... 179/2 EB |
| 4,479,226 | 10/1984 | Prabhu et al. ....................... 375/1 |
| 4,513,412 | 4/1985 | Cox ................................... 370/29 |
| 4,517,699 | 5/1985 | Freeburg et al. ................. 370/82 |
| 4,519,068 | 5/1985 | Krebs et al. ....................... 370/82 |
| 4,528,659 | 7/1985 | Jones, Jr. .......................... 370/80 |
| 4,549,308 | 10/1985 | Lo Pinto ........................... 455/26 |
| 4,574,163 | 3/1986 | Zato ............................... 179/2 EA |

OTHER PUBLICATIONS

E. J. Addeo; An Approach to Digital Signal Processing for a High Capacity Mobile Telephone System; 26th Annual Conference of the IEEE Vehicular Technology Group, Mar. 1976.

V. Hachenburg, B. D. Horn & J. T. Smith; Data Signalling Functions for a Cellular Mobile Telephone System; IEEE Transactions on Vehicular Technology; vol. VT-26, No. 1, Feb. 1977.

List Continued on next page.

*Primary Examiner*—Robert G. Lev
*Attorney, Agent, or Firm*—Raymond A. Jenski; Rolland R. Hackbart

[57] ABSTRACT

A data message transmission system for a cellular radiotelephone system is disclosed. Data to be transmitted is converted into a format compatible with radio transmission prior to transmission. The data is reconverted to its original format following reception. Handoff is accomplished by halting the data transmission prior to handoff and resuming data transmission after handoff. Call supervision occurs via busy-idle bit coding.

63 Claims, 27 Drawing Figures

OTHER PUBLICATIONS

E. J. Addeo; Word Synchronization and Digital Signal Processing for a High Capacity Mobile Telecommunications System; 27th Annual Conference of the IEEE Vehicular Technology Group; Mar. 1977.

Z. C. Fluhr & P. T. Porter; Control Architecture; Bell System Technical Journal; vol. 58, No. 1, Jan. 1979.

R. E. Fisher; A Subscriber Set for the Equipment Test; Bell System Technical Journal; vol. 58, No. 1, Jan. 1979.

N. Erlich, R. E. Fisher & T. K. Wingard; Cell Site Hardware; Bell System Technical Journal; vol. 58, No. 1, Jan. 1979; pp. 163–166.

Efficiency of Cellular Mobile Radio with Variable Bit-Rate Speech Transmission; IEEE Transactions on Vehicular Technology; vol. VT-32, No. 3; Aug. 1983.

J. H. Scharen-Guival; What's Available in Today's Asynch Modem Marketplace; Data Communications; Dec. 1983.

Bell Telephone Laboratories; High Capacity Mobile Telephone System Technical Report; Dec. 1971; p. 1–1; part of AT&T Comments to Federal Communications Commission Docket 18262 Dec. 20, 1971.

Cellular Link is Step to Portable Office; Electronics; Jun. 28, 1984, pp. 48 & 50.

Firm Unveils Cellular Bridge; Info World; Jul. 2, 1984, pp. 11 & 12.

"Cellular Portable Telephone" Millicom.

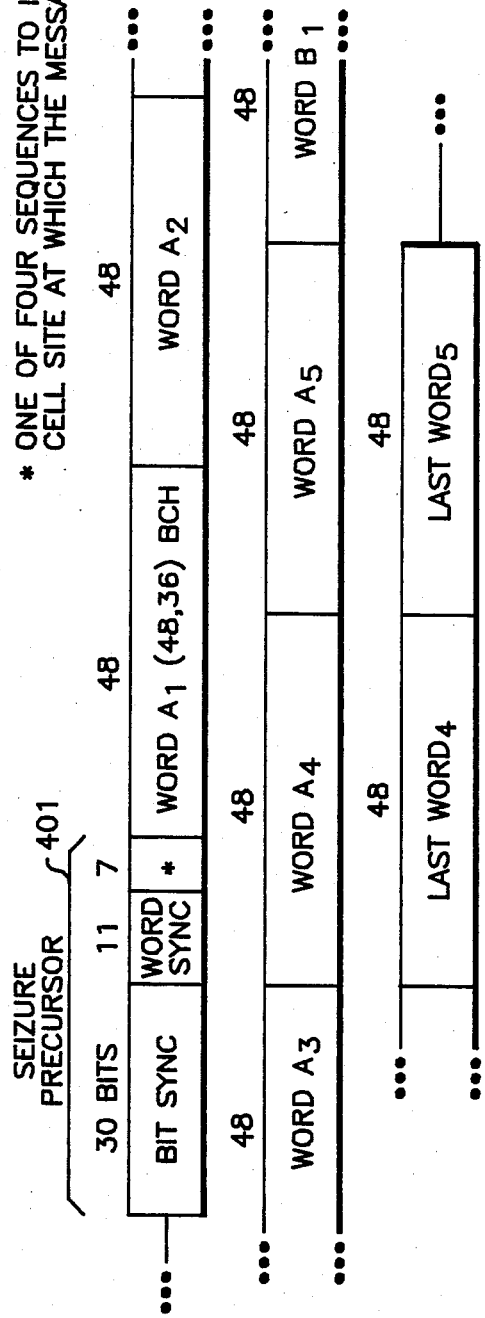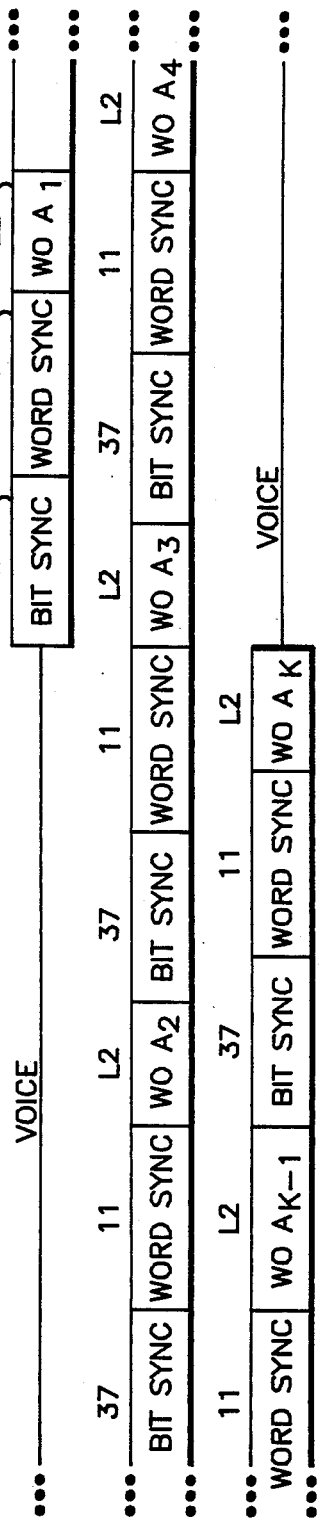
Fig. 4 PRIOR ART
Fig. 5 PRIOR ART

| WORD No. | RESERVED | CLASS | LENGTH | MESSAGE TYPE | PROTOCOL | RESERVED | CSE TYPE | BCH PARITY | ← FIELD DESIGNATOR |
|---|---|---|---|---|---|---|---|---|---|
| 3 | 0 | 0 | 1 | OE | 1 | 0 | 1 | x..x | ← FIELD CONTENTS |
| 2 | 1 | 1 | 5 | 8 | 1 | 14 | 4 | 12 | ← FIELD WIDTH |

REVERSE VOICE CHANNEL MESSAGE HEADER

*Fig. 9a*

| WORD No. | RESERVED | ANS/ORIG | HALF OR FULL DUPLEX | ODD OR EVEN PARITY | BIT RATE | BCH PARITY | ← FIELD DESIGNATOR |
|---|---|---|---|---|---|---|---|
| 00 | 0..0 | x | x | x | x | x..x | ← FIELD CONTENTS |
| 2 | 27 | 1 | 1 | 2 | 3 | 12 | ← FIELD WIDTH |

REVERSE VOICE CHANNEL DATA WORD

*Fig. 9b*

| FIELD TYPE | SAT | PRESENT CODE | PROTOCOL | RESERVED | MESSAGE LENGTH | MESSAGE TYPE | BCH PARITY |
|---|---|---|---|---|---|---|---|
| 10 | 11 | XX | 1 | X | 0 | 0F | X |
| 2 | 2 | 2 | 1 | 8 | 5 | 8 | 12 |

FORWARD VOICE CHANNEL MESSAGE HEADER

*Fig. 10a*

| WORD | RESERVED | CLASS | LENGTH | MESSAGE TYPE | PROTOCOL | RESERVED | CSE CAPABILITY | BCH PARITY |
|---|---|---|---|---|---|---|---|---|
| 3 | 0 | 1 | 1 | 0F | 1 | 0 | 1 | X..X |
| 2 | 1 | 1 | 5 | 8 | 1 | 14 | 4 | 12 |

REVERSE VOICE CHANNEL MESSAGE HEADER

*Fig. 10b*

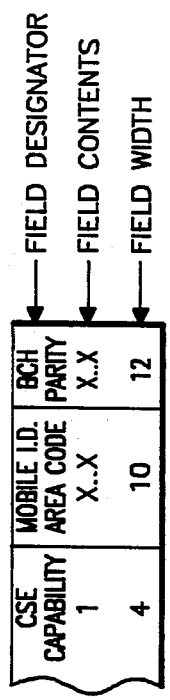
Fig. 11a — REVERSE CONTROL CHANNEL MESSAGE
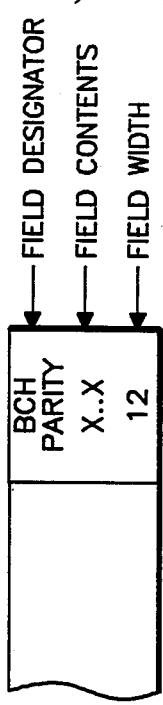
Fig. 11b

Fig. 12a

| CONTROL | DIGITAL COLOR CODE | No. OF CHAR. | CONTROL INFO. ID / IM | C2 | C3 | BCH PARITY | C4 | C5 | C6 | C7 | BCH PARITY |
|---|---|---|---|---|---|---|---|---|---|---|---|
| 3 | XX | 4 | 2 / 1 | X | X | X.X | X | X | 0 | 0 | X.X |
| 2 | 2 | 3 | 3 / 4 | 7 | 7 | 12 | 7 | 7 | 7 | 7 | 12 |

CONTROL/DATA FRAME WITH POWER CHANGE COMMAND (4 CHARACTER TRANSMITTED)

Fig. 12b

| CONTROL | DIGITAL COLOR CODE | No. OF CHAR. | CONTROL INFO. ID / IM | C2 | C3 | BCH PARITY | C4 | C5 | C6 | C7 | BCH PARITY |
|---|---|---|---|---|---|---|---|---|---|---|---|
| 2 | XX | 0 | 2 / 1 | 0 | 0 | X.X | 0 | 0 | 0 | 0 | X.X |
| 2 | 2 | 3 | 3 / 4 | 7 | 7 | 12 | 7 | 7 | 7 | 7 | 12 |

CONTROL FRAME WITH POWER CHANGE CONFIRMATION (NO CHARACTER TRANSMITTED)

Fig. 14a

| CONTROL | DIGITAL COLOR CODE | No. OF CHAR. | CONTROL INFO. ID / IM | C2 | C3 | BCH PARITY | C4 | C5 | C6 | C7 | BCH PARITY |
|---|---|---|---|---|---|---|---|---|---|---|---|
| 2 | XX | 0 | 0 / 2 | 0 | 0 | X.X | 0 | 0 | 0 | 0 | X.X |
| 2 | 2 | 3 | 3 / 4 | 7 | 7 | 12 | 7 | 7 | 7 | 7 | 12 |

CONTROL FRAME WITH HANDOFF COMMAND (NO CHARACTER TRANSMITTED)

Fig. 14b

| CONTROL | DIGITAL COLOR CODE | No. OF CHAR. | CONTROL INFO. ID / IM | C2 | C3 | BCH PARITY | C4 | C5 | C6 | C7 | BCH PARITY |
|---|---|---|---|---|---|---|---|---|---|---|---|
| 2 | XX | 0 | 0 / 2 | 0 | 0 | X.X | 0 | 0 | 0 | 0 | X.X |
| 2 | 2 | 3 | 3 / 4 | 7 | 7 | 12 | 7 | 7 | 7 | 7 | 12 |

CONTROL/DATA FRAME CONFIRMING HANDOFF COMMAND (Field designators: FIELD DESIGNATOR / FIELD CONTENTS / FIELD WIDTH)

CELLULAR VOICE AND DATA RADIOTELEPHONE SYSTEM

This is a continuation of application Ser. No. 630,481 filed July 13, 1986, now abandoned.

BACKGROUND OF THE INVENTION

This invention generally relates to a radio data transmission system and more particularly to a mobile or portable radiotelephone system having the capacity of efficiently transmitting data over a duplex radio channel which may change in frequency as the remote subscriber unit changes location.

Mobile radiotelephone service has been in use for some time and traditionally has been characterized by a central site transmitting with high power to a limited number of mobile units in a large geographic area. Mobile transmissions, due to their lower power, are received by a network of receivers located remote from the central site and returned to the central site. Because of a limited number of radio channels available (23 channels but, because of interference considerations, only 15 channels are effectively available), a maximum number of conversations for an entire city would equal the few channels available. Consequently, mobile telephone users discovered that radiotelephone was different than landline telephone due to the often busy conditions of the channels.

The reallocation of the 800 to 900 MHz spectrum in the early 1970's has made available approximately 1000 channels of mobile radiotelephone use in a band of frequencies well suited for limited range propagation. Cellular technology developed in response to the need and the reallocation.

A cellular system characteristically has the coverage area divided into contiguous smaller coverage areas (cells) using low power transmitters and receivers. One cellular system is further described in U.S. Pat. No. 3,906,166 assigned to the assignee of the present invention. The limited coverage area enables the channel frequencies used in one cell to be reused in another cell geographically separated according to a predetermined plan. One such plan is disclosed in U.S. Pat. No. 4,128,740, Graziano, assigned to the assignee of the present invention. Thus a large number of channels can be made available in a metropolitan area and the service can appear to be identical to a standard telephone.

The cell system typically utilizes one channel in each cell to receive requests for service (on a "reverse set-up" frequency) from subscriber units, to call subscriber units (on a "forward set-up frequency" and to instruct subscriber units to tune to a frequency pair where a conversation may take place (a "voice" channel). The one "set up" channel in each cell is continuously assigned the task of receiving and transmitting data and is the channel to which the subscriber unit tunes when not in a conversational state.

Since the cells may be of relatively small size (approximately 10 miles in radius), the likelihood of a mobile or portable subscriber unit traveling out of one cell and into another is high. To maintain communications, the subscriber unit is "handed-off" between one cell and another. The cell systems in use track the unit and decide when a handoff is necessary to maintain quality communications. The subscriber unit is commanded, via a high speed data message interrupting the audio communications on the voice channel, to retune the transceiver to another frequency which is available in a new cell. This handoff requires a relatively short period of time and the user is generally unaware of the occurrence.

The data messages are transmitted in a Manchester encoded format, a format which is well known by those skilled in the art, at a speed of 10 kilobits per second in the United States. (Other countries such as the United Kingdom, have different data speeds such as 8 kilobits per second). This digital transmission system has been thoroughly studied for application to high capacity mobile telephone systems and the error rates. spectrum occupancy. Immunity to radio channel fading, and other performance characteristics have been extensively reported.

Since cellular telephone systems provide performance characteristic of the land line telephone system and interconnect with it, subscribers expect land telephone system features from the cellular telephone system. One such feature is the transmission of data from one location to another. Many telephone subscribers connect data communications devices, such as a personal computer, to the telephone system via a modem. Modems are familiar to those skilled in the art and fundamentally operate by converting data "1" and "0" levels to distinct tones or to particular tone waveform phase relationships which can be transmitted by the land telephone network.

It would be natural to connect a computing device via a modem to a radiotelephone subscriber unit for communication with another data generating device via the land telephone network. In fact, this has been done and produced unsatisfactory results. Rapid multipath fading, commonly experienced in the high frequency cellular radiotelephone communications, causes gaps and significant phase changes in modem-generated tones such that data carried by the radio channel becomes garbled or missing. Furthermore, a handoff between cells, which to a human engaged in conversation is virtually unnoticeable, becomes a formidable obstacle for the communication of data generated by a data generating device.

SUMMARY OF THE INVENTION

Accordingly, it is an object of the present invention to enable data to be communicated via a radiotelephone system.

It is a further object of the present invention to provide protection against multipath fade induced data loss.

It is a further object of the present invention to provide protection against data loss caused by a subscriber unit handoff.

These and other objects are achieved in the present invention which is a data message transmission system used in a radiotelephone system which communicates data messages between remote subscriber stations and fixed site stations. A data message is converted from its original format to a second data format which is compatible with radio channel transmission prior to transmission. Upon reception, the message is reconverted to its original data format. The data transmission may be halted by a command which causes the cessation of data prior to handoff. When handoff is complete, the data transmission resumes on a second radio channel.

BRIEF DESCRIPTION OF THE DRAWINGS

FIG. 4 is a timing diagram of the data signalling format used on the reverse set up channel of a conventional cellular system.

FIG. 5 is a timing diagram of the data signalling format used on a voice channel of a conventional cellular system.

FIG. 9a is a timing diagram of a reverse voice channel message header which preceeds a voice channel command.

FIG. 9b is a timing diagram of the reverse voice channel command data word which follows the header of FIG. 9a.

FIGS. 10a and 10b are timing diagrams of forward and reverse voice channel message headers.

FIGS. 11a and 11b are timing diagrams of message data words which follow the headers of either FIG. 10a or 10b.

FIGS. 12a and 12b are timing diagrams of forward voice channel control data words which cause the subscriber cellular equipment to change transmitter power.

FIG. 14a is a timing diagram of a forward voice channel data command word initiating the handoff process in the present invention.

FIG. 14b is a timing diagram of a reverse voice channel data command word confirming the handoff command of FIG. 14a.

DETAILED DESCRIPTION OF THE PREFERRED EMBODIMENT

Figure 1:
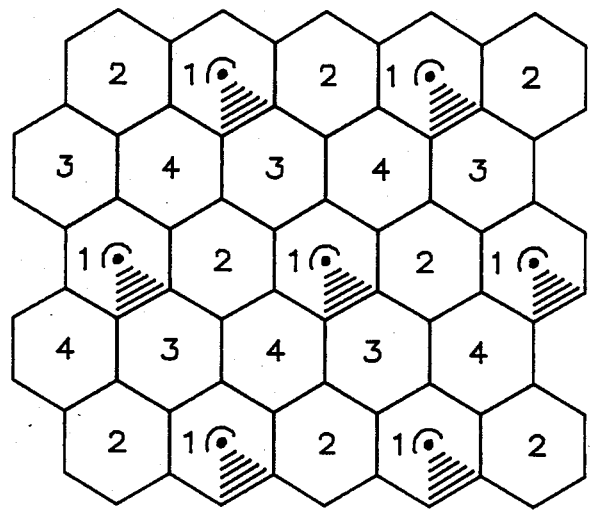
FIG. 1 depicts a simplified conventional cellular radiotelephone radio coverage pattern.

A representation of a typical cellular system is shown in FIG. 1. In this representation, a geographic area is divided into a plurality of radio coverage areas commonly called cells. In this representation each cell is shown as a hexagon for convenience of analyis while in reality these coverage areas would be determined by radio propagation and topography. In one implementation of a cellular system, the fixed transmitters and receivers are located at the center of each cell and illuminate the cell omni-directionally or directionally thereby further dividing the cell into smaller sectors. Further discussion of a sectorized cellular system is found in the aforementioned U.S. Pat. No. 4,128,740.

Figure 2:
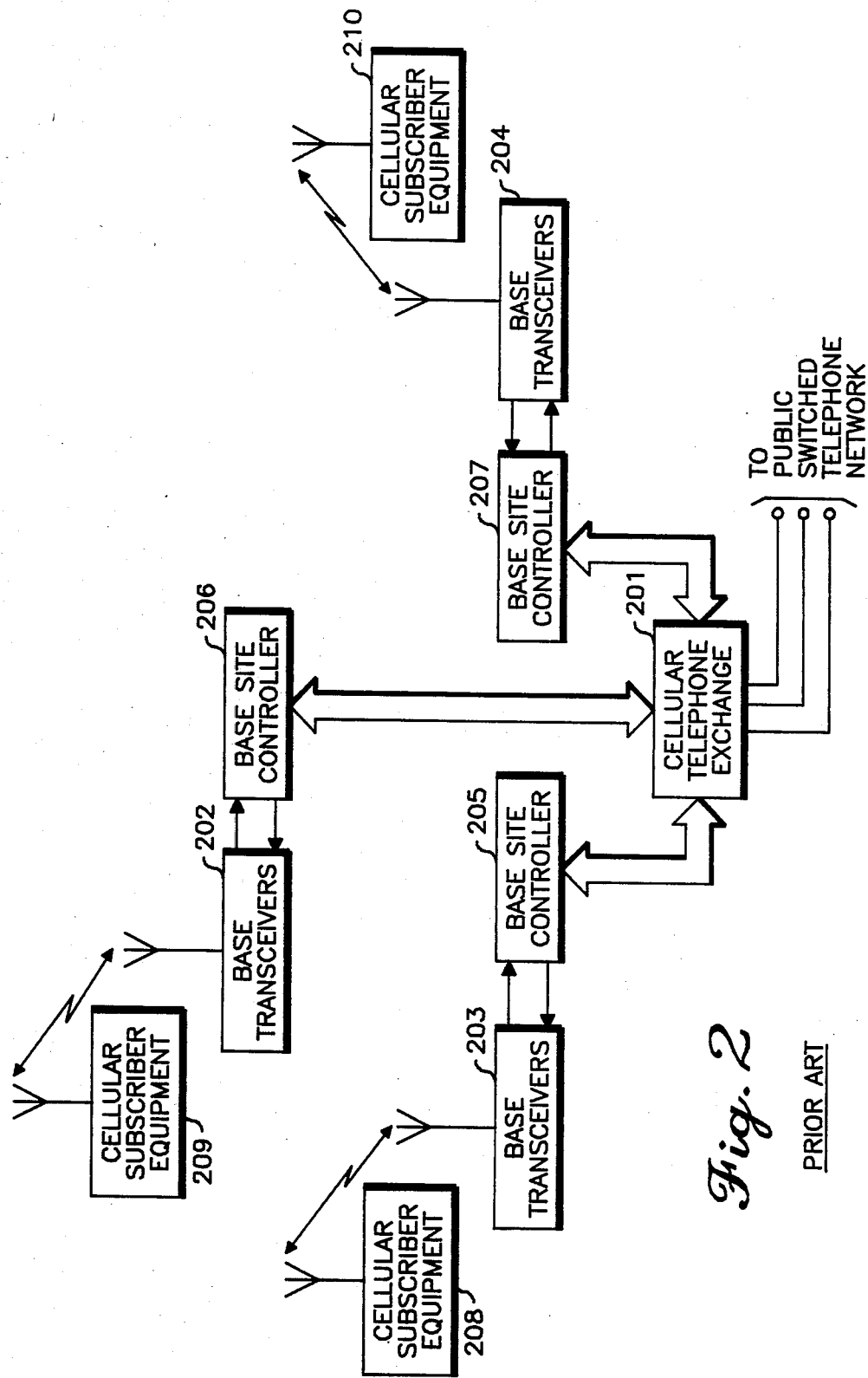
FIG. 2 is a block diagram of the equipment which may be found at a typical three cell cellular radiotelephone system.

Fixed equipment which can be found in a cellular system is shown in FIG. 2. Call routing and public switched telephone network (PSTN) interface is performed by a cellular telephone exchange 201, such as an EMX 500 marketed by Motorola, Inc., which accepts a telephone call from either the PSTN or the radio system and routes the call to its proper destination. Connected to the cellular telephone exchange 201 is a plurality of fixed base station radios transmitters and receivers shown as transceiver groups 202, 203, and 204 which are more directly under the control of a base site controller (BSC) 205, 206, and 207 for each transceiver group. In the preferred embodiment each BSC also controls the assignment of mobile or portable radiotelephones, known collectively as cellular subscriber equipment (CSE), to one of the radio channels which is available in the group of base station transceivers covering the cell in which the CSE is located. For example, one of the transceivers of transceiver group 203 is assigned the task of transmitting commands, on a forward setup half of a duplex channel, and receiving requests, on a reverse setup half of a duplex channel. Conversation occurs on another duplex channel assigned to another transceiver of group 203. Thus, one base station transceiver of group 203 may be the conversation or voice channel transceiver for cellular subscriber equipment (CSE) 208 while the CSE 208 is within its cell. As the CSE 208 travels from one cell to another it is instructed to tune to one of the voice channels available to the transceivers in that cell.

Thus a telephone call may come in from the PSTN and be routed to a particular CSE 208 by the cellular telephone exchange 201 via data bus and voice line to a BSC 205 which determines if a voice channel is available and instructs CSE 208 to tune to that voice channel via the forward set up channel transmitted via one of the base transceivers of 203. The CSE 208 tunes to the voice channel for the remainder of the telephone call in this cell.

To provide a check of the continuing operation of the CSE during a call, a tone, equivalent of the DC supervision in normal telephone operation, is transmitted continuously from the BSC and transponded by the CSE. This tone is known as supervisory audio tone (SAT). In conventional cellular systems, small offsets in frequency of the SAT are used to identify each BSC and if the CSE does not transpond the proper SAT with offset, the call will be terminated.

Base transceivers 203, 202, and 204 are assigned a set of channels in a pattern designed to minimize interference. One such pattern is shown in Table 1, which lists the first 333 channels available in the United States for cellular radiotelephone service. Each number corresponds to a duplex radio frequency pair which enables a simultaneous two-way conversation. One channel among the set is selected to be a signalling channel and the remainder of the channels in each set are designated voice channels for carrying conversations betweeen the cellular subscriber equipment and the base transceivers.

Figure 3:
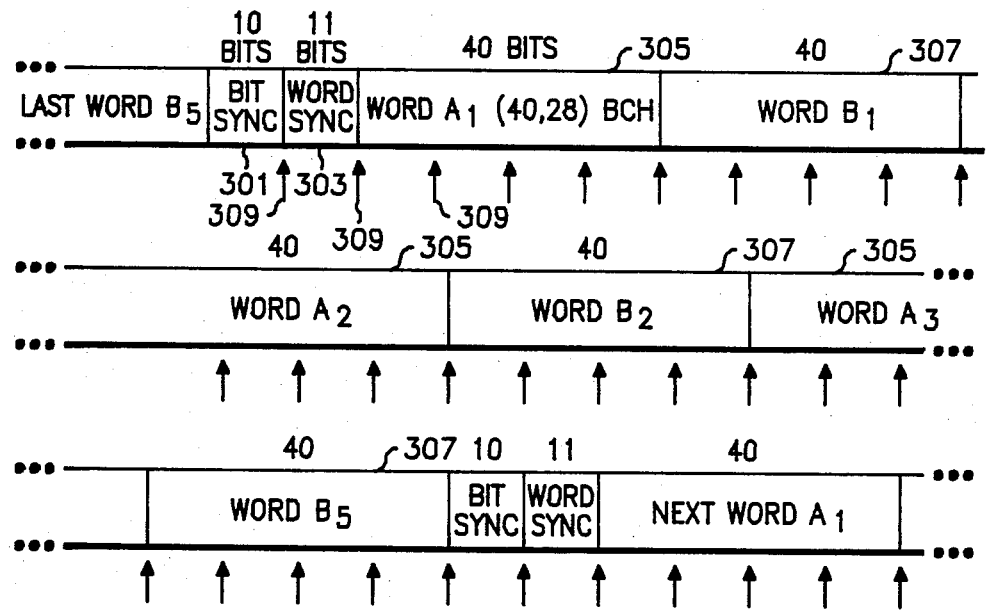
FIG. 3 is a timing diagram of the data signalling format used on the forward set up channel of a conventional cellular system.

A large amount of information must be sent on the signalling channel, therefore efficient design suggests that the data be organized into a synchronous format of fixed length words and synchronizing pulses. The format for the signalling on the forward set up channel is shown in FIG. 3 and the format for the reverse set-up channel is shown in FIG. 4. Since data reliability on the radio transmission path is relatively low, error control techniques are utilized to improve the reliability. One source of poor reliability is the bit error introduced in the radio channel by Rayleigh fades caused by cellular subscriber equipment motion through the multi-path interference patterns generated by reflection from obstacles near the receiving equipment. These errors occur in dense bursts with the average burst duration related to the average fade length. Furthermore, the bit error probability is substantially independent of data rate until bit lengths approach the average fade duration indicating that data rates should either be very low or as high as the channel band width allows. Due to the amount of information to be transmitted and the availability of various error correction techniques, a 10 KBPS data rate was chosen for the cellular system in the United States. To combat the burst errors caused by fading, each data word is encoded and repeated five times with a second data word interleaved between each repeat of the first. A bit-by-bit 3 out of 5 majority vote is taken at the CSE receiver to make a best guess of the error corrupted detected word.

The coding used is a shortened (63, 51) BCH code which is well known in the art. The forward set-up channel employs a (40, 28) BCH code and the reverse set-up channel employs a (48, 36) BCH code. This code has the capability of correcting two bit errors while detecting at least three more and along with the 3 out of 5 majority voting technique, provides a good tradeoff selection between a low probability of not detecting a message when one is sent and a low probability of detecting a wrong message.

Referring to FIG. 3, the format on the forward set-up channel is shown in a timing diagram. Data on this channel are transmitted continuously so that CSE'S can synchronize to the format and interpret the data. The basic periodicity of the bit stream is 463 bits consisting of a ten bit bit synchronization which is a sequence of alternating ones and zeros commonly known as dotting. Following bit sync 301 is an 11 bit word synchronization 303, which is a Barker code for word synchronization formed of a bit sequence that is highly unlikely to be created by rhythmic data or random noise and in a typical U.S. cellular system is 11100010010. This bit and word synchronization permits the CSE'S to frame the forward set-up channel messages and determine when each word and each sequence of the five word message repeats begin and end. Each CSE decodes either word A, 305, or word B, 307, depending upon the CSE's programming.

An additional bit, called the busy-idle bit 309, is inserted immediately following the bit sync 301, the word sync 303 and every ten bits of each message word. If this bit is a one, the reverse set-up channel of the particular cell transmitting the message stream is idle and any CSE desiring to initiate a call or to acknowledge a call may transmit. If the bit is a zero, the reverse set-up channel is being used by another CSE and the CSE wishing to transmit on that channel must wait a short time interval and monitor the channel again until idle bits are observed.

On the reverse set-up channel, the CSE'S act in a random and competitive way to initiate calls. A different format, shown in FIG. 4, is used because all initiation signals and interferences are turned on and off in an uncorrelated fashion. A reverse setup channel message is preceeded by a 48 bit seizure precursor 401 and consists of one to five words of 48 bits each repeated five times. The receiving BSC performs a bit by bit three out of five majority vote to determine the 48 bit encoded word. It then may correct up to one error or reject the message as uncorrectable.

Data messages may also be sent on the voice channels. These messages are primarily handoff messages directing the CSE to tune to another channel, but may also include other control functions such as CSE transmitted power control. The technique used is "blank and burst" in which the voice signal is muted and the data signal, shown in FIG. 5, is sent at a 10 kilobit rate. The format of the blank burst message on the forward voice channel consists of 101 bits of dotting bit synch 501, 11 bits of Barker code word sync 503 and 40 bits of message data 505. This grouping of bit sync, word sync, and message is repeated ten more times outbound from the fixed equipment for a total of 11 consecutive transmissions, except that in the last 10 repeats the bit sync is limited to 37 bits of dotting rather than 101. The reverse blank and burst message is similar to the forward message format except that the words 505, which are repeated five times, contain 48 bits.

The traditional land line telephone employs a DC current to indicate whether the telephone user is on hook or off hook. Most cellular radio telephone systems employ a tone analogous to the DC current for call supervision and for ensuring that adequate signal level is maintained during a call. This tone is known as supervisory audio tone (SAT). Three SAT tone frequencies are used in cellular systems in the United States. These frequencies are 5970, 6000, and 6030 Hz. Only one of these frequencies is employed at a given cell site. The tone is transmitted from the base transceiver to an active CSE, where it is received and retransmitted. The BSC expects the specific SAT frequency it transmitted to be received from the CSE. If some other SAT is returned, the BSC interprets the incoming signal as being corrupted by interference and the audio path is muted.

As subscribers travel through the cellular system they may reach the coverage limit of one cell and therefore can be better served by another cell. The process of switching the call from one cell to another is known as handoff. Among the equipment of the base transceivers is a specialized receiver which measures the signal strength of each active CSE in the cell. This receiver is known as a scanning receiver, which may be a TLN2524A manufactured by Motorola Inc. If the measured signal strength for a particular CSE, for example CSE 208, is below a designated level, the BSC sends a handoff request to the cellular telephone exchange 201. The cellular telephone exchange 201 then queries the BSCs in cells adjacent to the requesting BSC 205 to measure the signal strength of the potential handoff CSE 208. Further information regarding signal strength measurement and channel assignment may be found in U.S. patent application Ser. Nos. 405,210 filed on Aug. 3, 1982 on behalf of Puhl et al. and 405,123 filed on Aug. 3, 1982 on behalf of McLaughlin, each assigned to the assignee of the present invention. If one of the adjacent cells detects a signal level meeting a predetermined criteria, the cellular telephone exchange 201 makes a connection between the existing radio channel, a new radio channel in the target cell, and the land party. An example of the requirements of the system needed to perform such a connection may be found in U.S. Pat. No. 4,301,531 by Lubin and assigned to the assignee of the present invention. A message is sent in blank and burst format on the voice channel to the CSE to mute the CSE'S audio and to change radio channels. This mute lasts approximately 400 msec in the preferred embodiment and is almost imperceptible to the listener. The audio is unmuted when CSE arrives on the new channel. If no channel is available, the CSE may continue its conversation while, in one implementation, its telephone number identification is put in a high priority queue for the first available channel in the new cell. Alternately, the conversation continues while the cellular telephone exchange polls the CSE signal strength periodically to determine if a handoff is still required. When a channel becomes available, the CSE is handed-off to that channel. Handoff in cellular systems which employ sectorized cells for base station receive may utilize a sector to sector handoff which may not require the full intervention of the cellular telephone exchange. Such a system is further described in U.S. patent application Ser. No. 405,210, filed on Aug. 3, 1982 on behalf of Puhl, et al and assigned to the assignee of the present application.

Because an increasing number of subscribers desire to transmit data rather than voice information over the cellular telephone system, a reliable data transmission method is required for a cellular telephone system. In the preferred embodiment of the present invention, data input at various speeds up to approximately 9.6 KBPS may be coupled to the CSE, converted to the data format heretofore used only on the forward set-up channel, and transmitted on a voice channel to the BSC where the data may again be reconverted to its original data speed. This technique utilizes a data transmission format proven to be robust and enabling the use of existing cellular equipment for encoding, decoding, and error correction. Although a 10 KBPS data rate will be discussed in detail hereinafter, it should be understood that similar data rates (e.g. 8 KBPS) may also be used given that data throughput is scaled accordingly.

A need to transmit data messages via a cellular system has been mentioned earlier. This need can be fulfilled by transposing the data input to the system into the forward set-up channel data format. This transposition is shown diagramatically in FIG. 6. The 40 bits originally used in the forward set-up channel signalling word A are used to contain a character word 601. The B word is redefined to contain a second character word 603. The A and B words, then, may be interleaved and repeated in a manner similar to that found in the data format of the forward set-up channel or the words may be transmitted only once without repeat to accommodate high data speed. The ten bit bit sync and the 11 bit word sync remain as delimiters of the character words.

Figure 6:
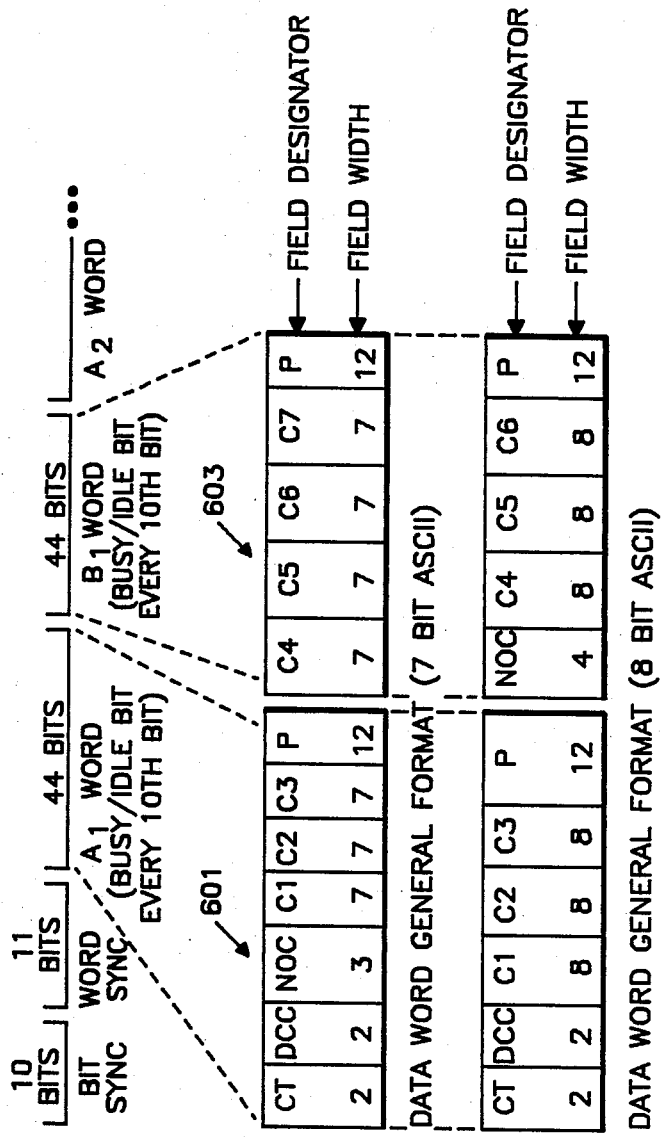
FIG. 6 is a timing diagram of two data transmission formats which may be employed by the present invention.

The character words themselves are subdivided as further shown in FIG. 6. In the data word general format for seven bit ASCII characters, the transposed input data are contained in seven fields indicated C1 through C7. Each field contains seven bits which may correspond to the seven bit ASCII characters. The A word contains seven control bits. The first two bits designated CT indicates the general contents of the two A and B word frame, which can be an input data frame only, a data frame with control information. or a control information frame only. The second two bits of the A word field, designated DCC, are the digital color code (or digital SAT) which identify the particular BSC with which the message is associated and replaces the SAT tone when the data mode is selected. The next three bits, designated NOC, shows the number of input data characters contained in this frame. Each field ends with 12 BCH parity bits, designated P which are generated according to the (40, 28) BCH coding technique. For the eight bit ASCII character general format, the A word contains the CT and DCC fields plus the three eight bit character fields C1, C2, and C3 and parity P. The B word contains the NOC with one additional bit, three eight bit character fields, C4, C5, and C6, and parity P.

The busy-idle bits are retained in their customary location in the frame and are also used as a digital color code in place of a tone SAT. In the preferred embodiment the four bits in the A word and the B word corresponding to the busy-idle bits are each set to a predetermined binary value when the BSC places the channel in the data mode. This A word, B word pattern allows four unique digital SAT codes to exist (0000 0000; 000 1111; 1111 0000; and 1111 1111) corresponding to the four codes available in the aforementioned DCC field. The CSE transponds the digital SAT code back to the BSC where the BSC may conventionally error correct the digital SAT and decide whether the CSE is the correct CSE for service to be continued. Use of busy-idle bits and the DCC field to carry the digital color code information enables rapid code detection at the BSC. Other digital color coding of the busy-idle bits may be employed without departing from the scope of this invention.

The partitioning of the bits available in each word using 7 bit ASCII characters is shown in Table 2. From this table it can be deduced that there are 245 character bits per each 463 bit frame available to input data. At a transmission of 10,000 bits per second, approximately 5,292 character bits may be transmitted per second. Thus, an input data rate of 4,800 BPS can comfortably be accommodated without repeats by the signalling scheme of the present invention. Slower input data rates such as 1,200 BPS or 300 BPS would be transmitted by this signalling scheme with an appropriate number of word repeats. Furthermore, at 300 BPS, character repeats within each word may be used to provide even greater error immunity. Eight bit ASCII character word bit partitioning is shown in Table 3. In this instance, 240 character bits per frame are available to input data thereby providing a character bit rate of approximately 5184 character bits per second at a transmission rate of 10,000 bits per second. Again, input data rates of 4,800 BPS can be accommodated.

Data rates as fast as 9,600 BPS may be accommodated with modification to the aforementioned format. This modification removes most of the busy idle bits and all of the field control characters thereby making available all 44 bits in each word. Two additional words are added to each frame increasing the number of bits per frame from 463 to 551. At at 10,000 BPS transmission data rate, 9,600 BPS may be transmitted without repeats. Further discussion will describe the application of the data formats using the seven bit ASCII character format at 8 KBPS as an example. The invention need not be so limited.

Figure 7:
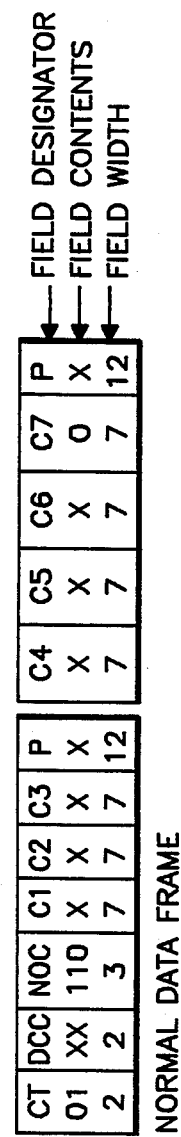
FIG. 7 is a timing diagram of the data transmission format of the present invention showing the contents of the data fields for a normal data frame.

Returning to the general forward setup channel format, the field contents of a normal data frame can be seen in FIG. 7. In FIG. 7, 6 data characters are transmitted which is indicated by the binary "110" in the number of characters (NOC) field.

Figure 8:
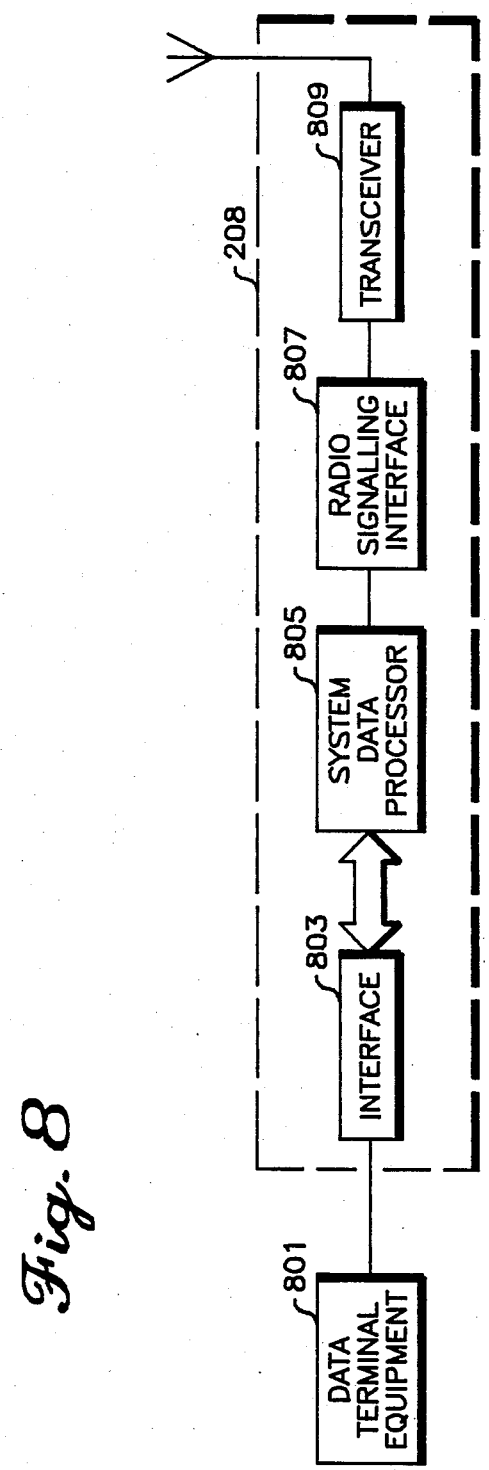
FIG. 8 is a simplified block diagram of the remote subscriber cellular equipment which incorporates part of the present invention.

A CSE 208 equipped for data service is shown in FIG. 8. Data terminal equipment 801, which can be any data generating/receiving equipment, is preferably connected to an RS 232 interface 803 which is commonly known in the art. Alternately, interface 803 may be a modem interface between the data terminal equipment 801 and the system data processor 805. System data processor 805 may be a microprocessor controlled data handler employing a conventional microprocessor, such as an MC6801 manufactured by Motorola Inc., which accepts input data at its original data rate, calculates BCH parity, removes start/stop bits, and formats the data into the previously described forward control channel NRZ. The NRZ data stream is presented to the radio signalling interface 807 for addition of busy-idle bits and conversion to a Manchester format compatible with radio transmission. Radio carrier modulation of the data and transmission on an assigned channel is accomplished by transceiver 809, which may be a conventional cellular transceiver.

Received data reverses the aforementioned transmission path from transceiver 809 where the data is recovered conventionally from the received radio carrier, to the radio signalling interface 807 where the Manchester data is converted to NRZ and the busy-idle bits are removed, and to the system data processor 805 where the data is corrected and reconverted to its original format and data rate. The data is then passed to the data terminal equipment 801 via interface 803.

When the CSE is instructed by the user to enter the data mode and begin responding to the data transmission format, the CSE sends a "X-on" ASCII character to both the remote data terminal and the land data terminal. This action assures that each data terminal can begin data transmission. The CSE equipment is prevented from requesting any of the vertical services (i.e. call waiting or three-party conferencing) normally accessable to cellular equipment. However, the CSE must be capable of adjusting its transmitter power level up or down as commanded by the BSC in a control command. The CSE must also acknowledge these commands in the data format. Whenever a CSE is commanded to enter the data mode, it must acknowledge its departure from the standard voice mode as a message response in voice channel format before moving to the data format. Similarly, whenever a CSE is commanded to leave data mode, it must send an acknowledgement of the departure from data mode in the data mode format.

To enter the data mode from a voice conversation mode, the CSE indicates a desire to enter the data mode and leave the conversation mode with a reverse voice channel request such as those shown in FIGS. 9a and 9b. The request message header is shown in FIG. 9a and defines the type of message and the type of CSE requesting data service. This particular message requires one data word which is shown in FIG. 9b and which characterizes the data equipment connected to the CSE. In the preferred embodiment the bit rate field of three bits indicates the bit rate used by the data equipment as follows:

0 = 110 BPS,
1 = 300 BPS,
2 = 600 BPS,
3 = 1200 BPS
4 = 2400 BPS, .
5 = 4800 BPS, and
6 = 9600 BPS.

The request message end is indicated by the last word field "00".

Figure 9C:
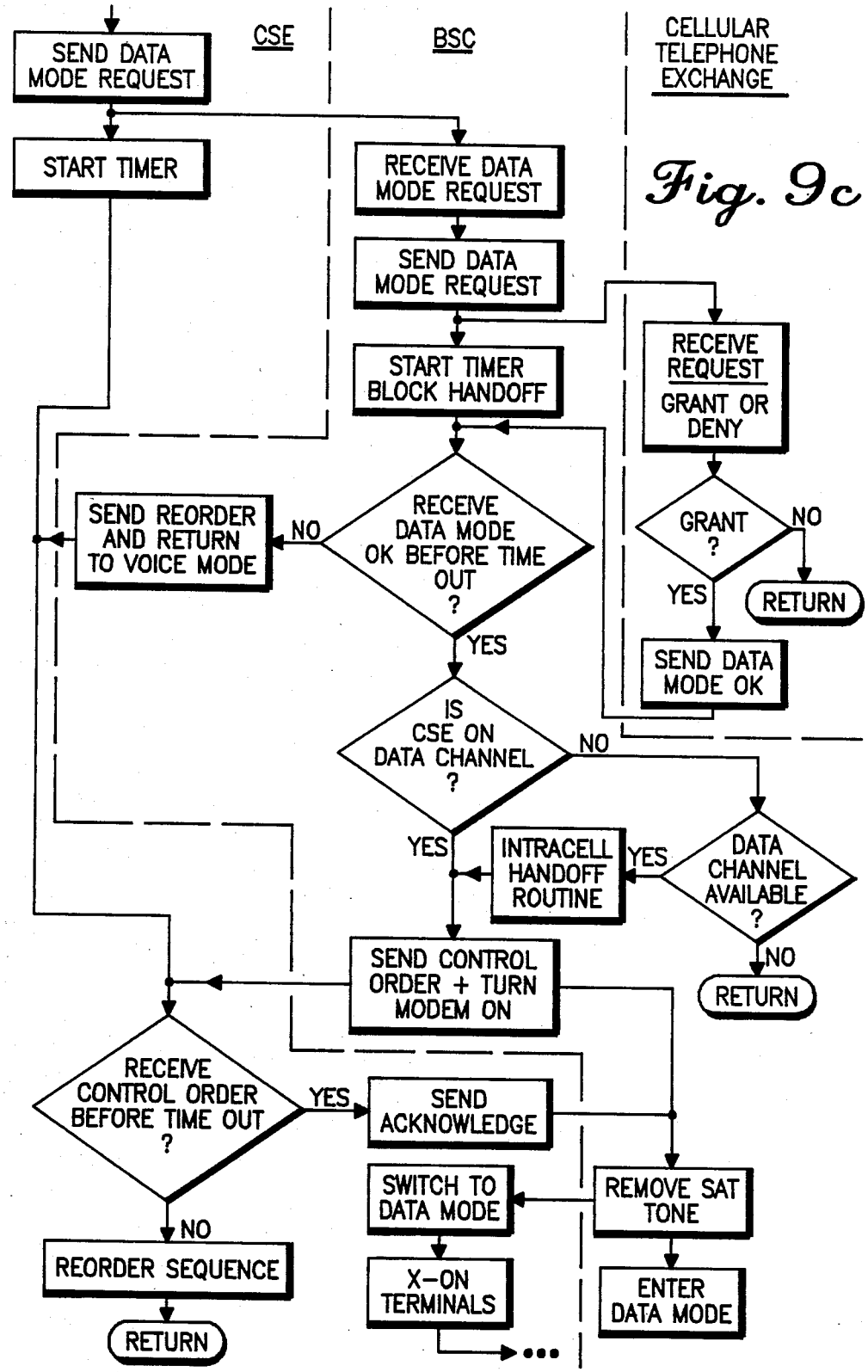
FIG. 9c is a flowchart of the data mode entry algorithm.

Referring to FIG. 9c, the BSC receives the data request message from the CSE on the reverse voice channel and sends a "data mode request" to the cellular telephone exchange. The CSE, as well as the BSC, starts a timer for a "data mode OK" response. The BSC additionally blocks handoff activity related to this channel until the CSE has reached a steady data mode state or timeout occurs. The cellular telephone exchange either grants or denies the data mode request depending upon the availability of channels or system loading constraints. If the request is denied, nothing is sent back to the BSC. The CSE will time out or enter an abbreviated reorder sequence as commanded by the BSC. The timeout enables the CSE to access vertical services in the voice mode. The reorder directs the CSE to inform the user via a reorder busy tone of the data mode denial and causes the CSE to remain in voice mode. If the data mode request is granted, the cellular telephone exchange sends a "data mode 0.K." to the BSC.

The first group of 333 channels available to the BSC were shown in Table 1. Each cell or cell sector is equipped to utilize the channels shown in one or more columns of Table 1. If a cell were configured with only a portion of the available channels given capability for data mode, the data channels may be selected from among those channels already assigned to that cell. One method of facilitating efficient use of these data channels causes all voice users on a channel, which can be either voice or data, to be handed off to voice only channels whenever a voice only channel is available. Thus, the assignment for initial call set up will be to initially assign voice only channels followed by an overflow to the voice/data channels.

When the BSC receives "data mode 0.K." and the channel on which the CSE is operating has data capability, then the BSC proceeds with a command to the CSE to enter the data mode. If the channel in use does not have data capability, the BSC determines if it has a channel available with data capability. If it has none, it allows the CSE to time out or commands it to enter an abbreviated reorder sequence. If the BSC has a data channel available, it goes through a port change request sequence with the cellular telephone exchange to move the CSE to the proper channel. This port change utilizes a standard handoff sequence as detailed hereinbefore.

Upon the successful assignment of a data channel, the BSC inserts a conventional data modem in the audio path of the ongoing call. It also sends a conventional cell system control order with digital color code identification on the forward voice channel, as shown in FIG. 10a, to tell the CSE to prepare for a data mode format. The CSE must acknowldge the control order with a confirmation before entering the data mode. This confirmation is shown in FIG. 10b which again is a message in the standard 48 bit reverse voice channel message format.

Upon reception of the CSE acknowledgement for entering data mode, the BSC removes the SAT tone and awaits a digital color code transponding by the CSE. To initiate the start of data transmission, the CSE sends "X-on" to the mobile data equipment and to the land line data terminal equipment to ensure the state of the connecting terminals. The voice channel is then in the data mode. In order to achieve the proper data rate, the BSC must insert and strip off, where appropriate, the start and stop bits and the parity bits of the asynchronous cellular telephone data stream. The BSC also continually monitors the data format for a request to return to the voice mode as well as proper digital color code and adequate signal strength.

The CSE may access the cellular system and request an immediate data mode entry as part of a standard call origination. The call is initially processed as an normal voice mode call except that the channel selected is a data channel. If there are no available channels the CSE will be redirected to another cell or will be instructed to enter the reorder sequence. The request for immediate entry into data mode message at the call origination is shown in FIGS. 11a and 11b. This four word message completely identifies the requesting CSE and the data requirements of the mobile data terminal.

Once the CSE reaches the assigned channel, it begins transponding the SAT tone. The BSC then automatically sends a data mode request to the cellular telephone exchange and the sequence of events continues as described earlier.

Certain commands from the BSC to the CSE must occur without causing the CSE to drop out of the data format. One such command is a power change command in which the BSC determines that the CSE must change the power level of the CSE transmitter in order to maintain a high quality path with minimum interference to other users. The BSC determines the power level for the CSE and injects a control command containing a new power level into the data format information being transmitted to the CSE. This command is shown in the forward setup channel data format in FIG. 12a. The CSE extracts the control information from the ID and IM fields of FIG. 12a thereby receiving the instruction to change transmitter power output to level 2 (ID=2) because field IM=1 in this example. This control iniormation displaces 1 data character which is subsequently transmitted one character position later in the data stream. A small first-in first-out buffer at the BSC enables this displacement to be absorbed without loss of characters.

The CSE adjusts its power level according to the control command and confirms its adjustment to the BSC. This confirmation is a control response injected into the data format stream being transmitted to the BSC by the CSE as shown in FIG. 12b.

From time to time the CSE may move out of the optimum range of radio coverage from one cell. At this time a handoff of the CSE call from one cell to another must occur. For example, the serving BSC of FIG. 2, 203, determines that a handoff is required. It sends in a "handoff request involving data" to the cellular telephone exchange 201 which includes the digital color code and frequency of the channel which is currently in use by CSE 208. The cellular telephone exchange 201 sends out a "measurement request involving data" which includes a digital color code and channel frequency indicated by BSC 203 to appropriate adjacent cells. A second BSC (BSC 202) into whose radio coverage area the CSE 208 has travelled, tunes its scanning receiver to the data channel in use. If the measurement is acceptable, BSC 202 sends in the measurement parameters to the cellular telephone exchange 201. If the measurement is not adequate for a handoff, no response is sent in to the cellular telephone exchange 201. When the cellular telephone exchange 201 receives measurement responses, it selects the best measurement and sends an "execute target" to the selected BSC, in this case BSC 202. BSC 202 then reserves a data channel, if available, keys the channel, turns on the modem, and switches the modem into the audio path.

Figure 13:
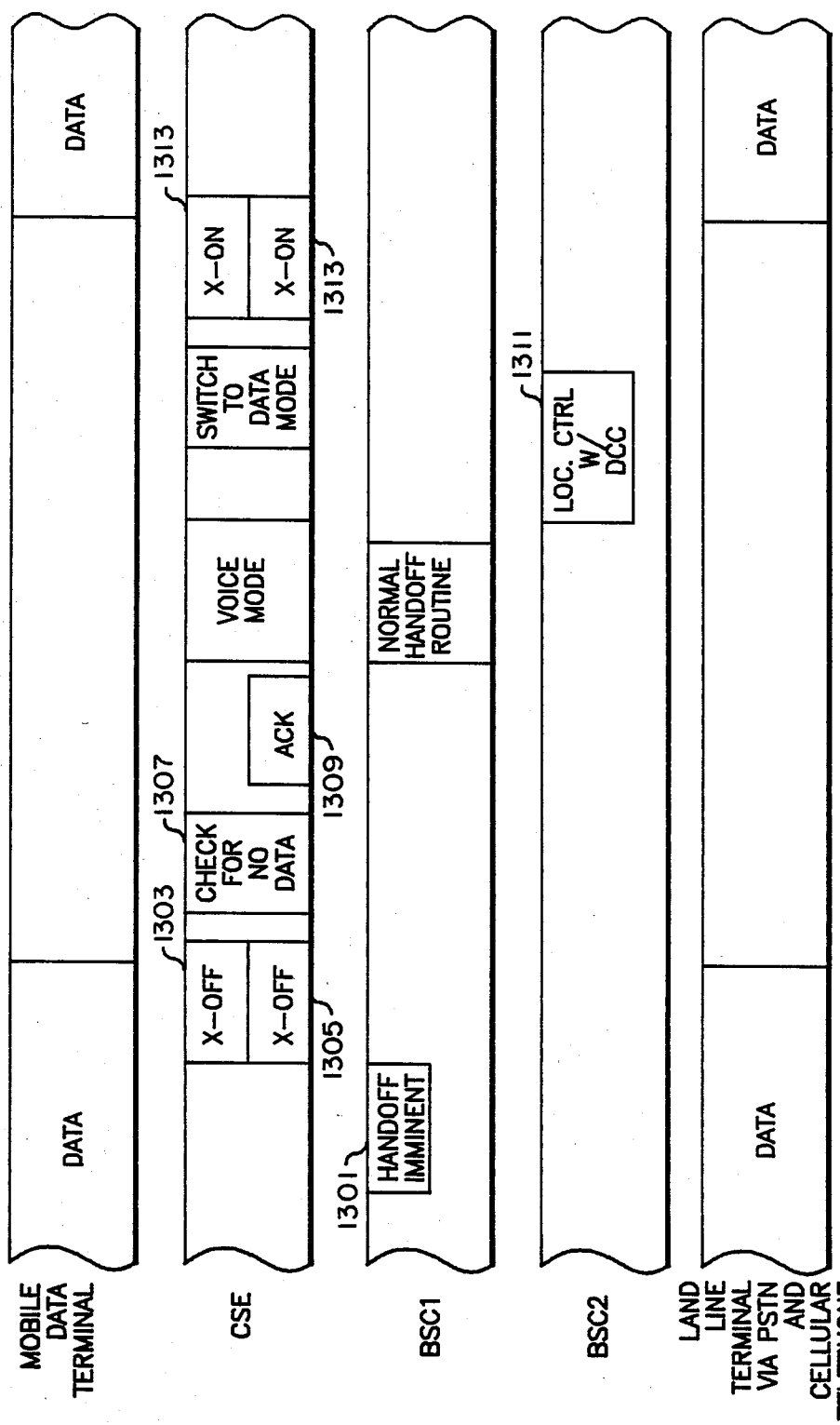
FIG. 13 is a relative timing diagram showing handoff as employed by the present invention.
Figure 15A:
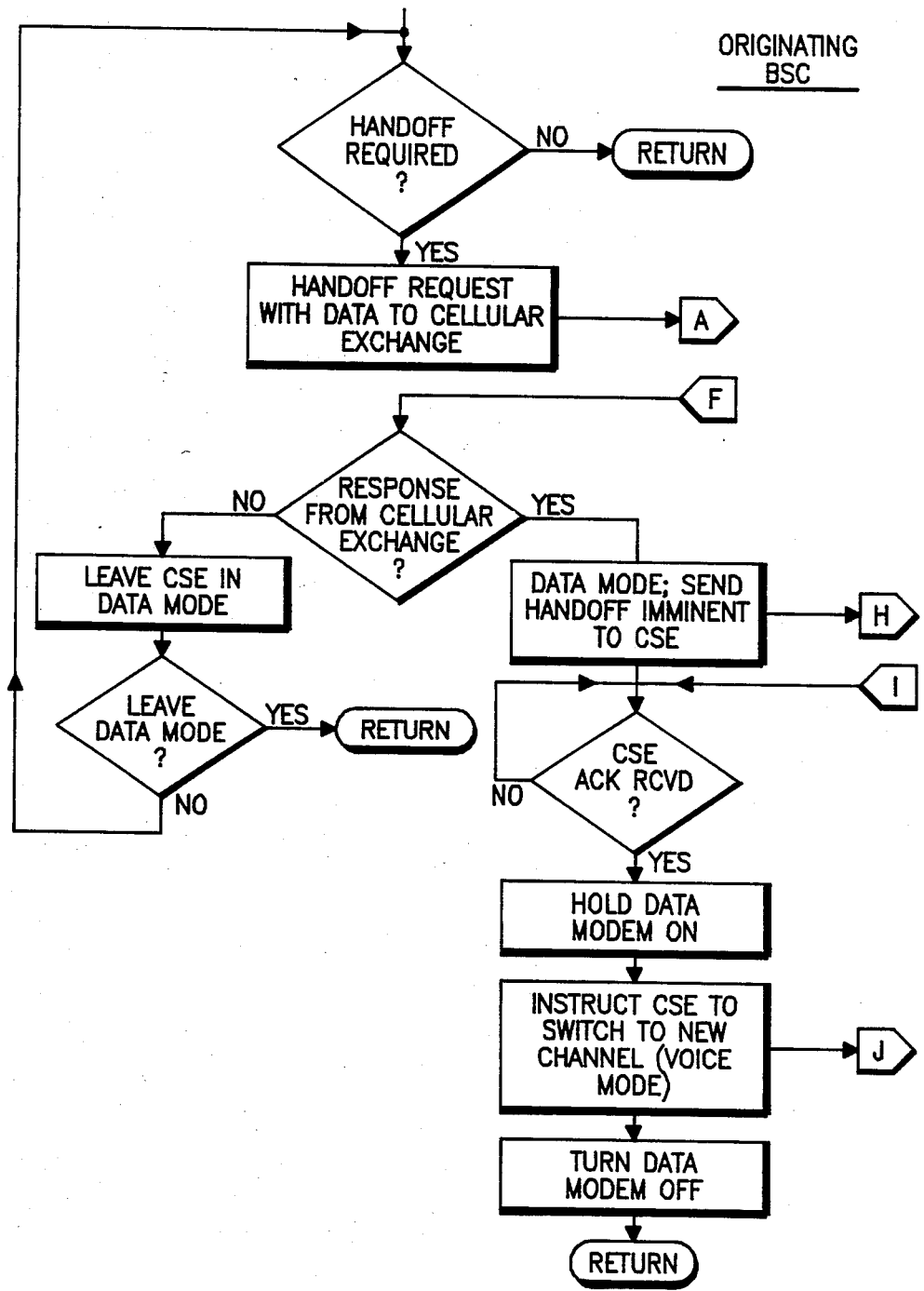
FIG. 15a, 15b, 15c, and 15d are flowcharts of the handoff algorithm as practiced in the present invention.
Figure 15B:
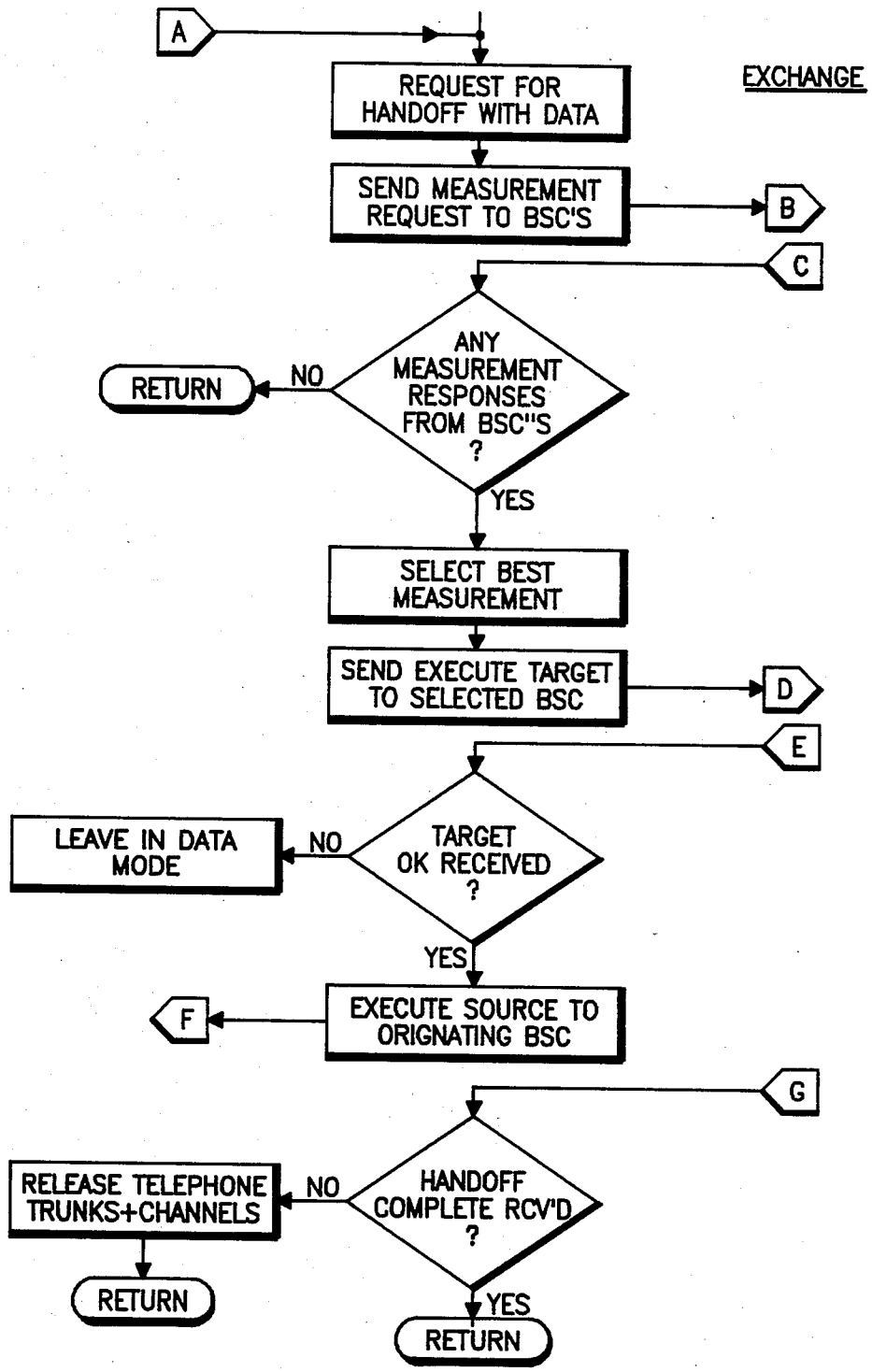
Figure 15C:
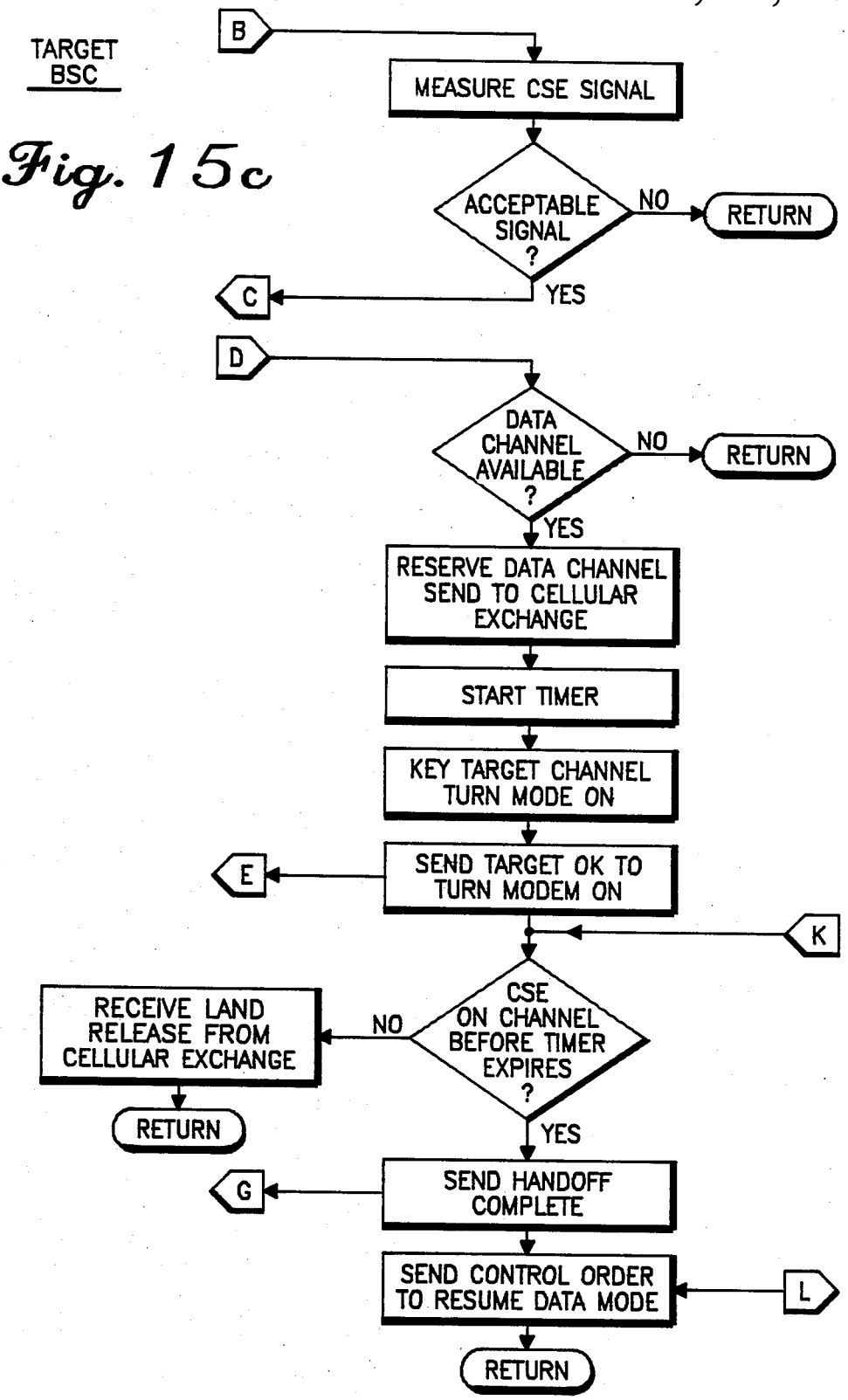
Figure 15D:
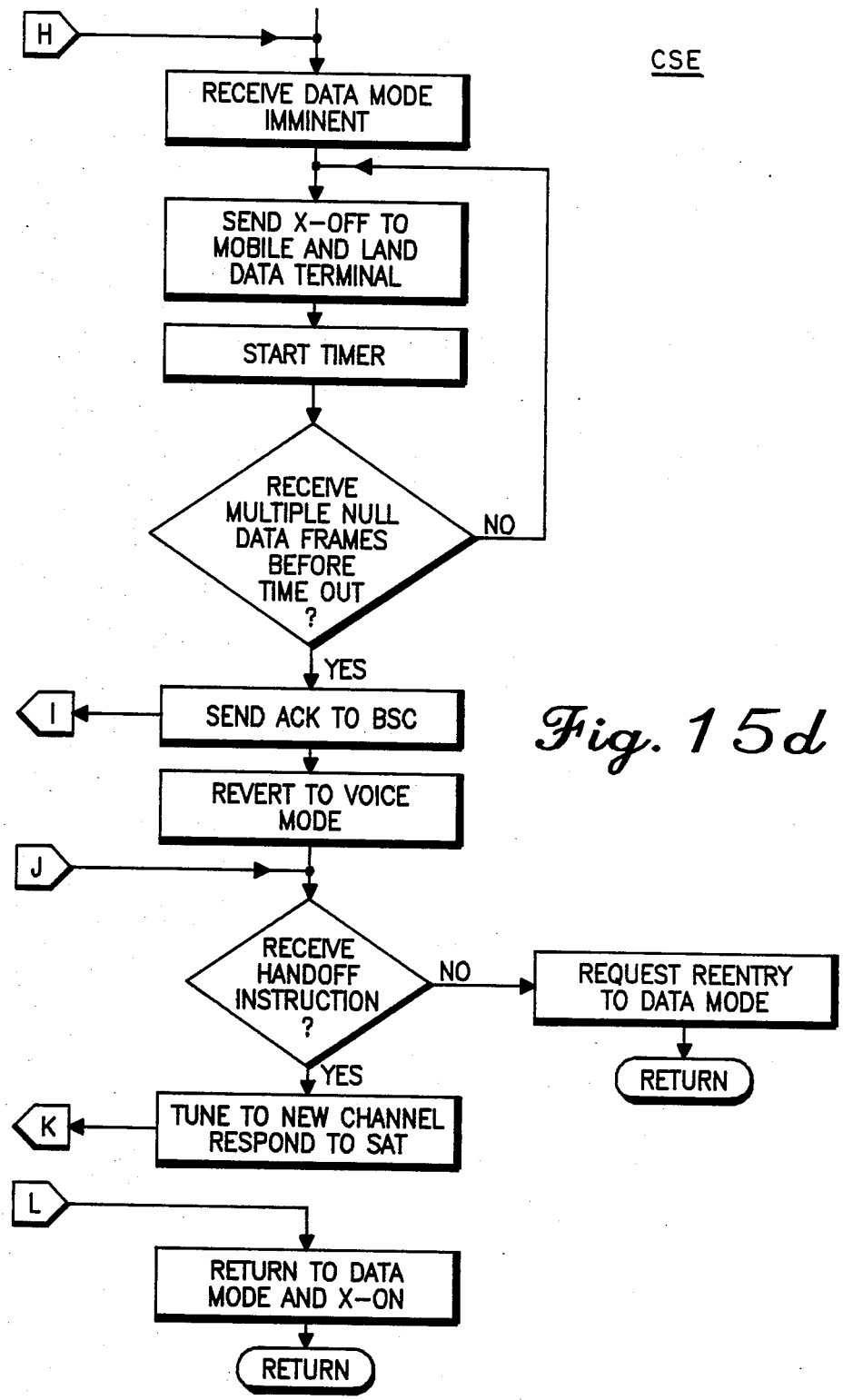

When BSC 202 returns a "target 0.K." message to the cellular telephone exchange 201 along with the reserved channel frequency and proper SAT sequence, the exchange sends an "execute source" to BSC 203 with the reserved channel number and proper SAT sequence. This causes BSC 203 to insert a command in the data format stream to alert the CSE 208 that a handoff is imminent. The response to the handoff imminent command, which is shown as 1301 in FIG. 13, is an "X-off" ASCII character communicated to both the mobile data terminal at 1303, and an "X-off" ASCII character, at 1305, which is transmitted via the data stream to the land line terminal. These X-off commands to the connecting terminals instructs them to stop transmitting data. The CSE monitors the data format stream for a number of null frames, which in the preferred embodiment may be 10 null frames, in both directions of the data stream at 1307 to be sure that both data terminals have ceased transmitting. Upon detection of the predetermined number of null frames, the CSE transmits an acknowledgement at 1309 which confirms the reception of the handoff command. The control frame transmitted in data mode on the forward voice channel is shown in FIG. 14a and its acknowledgement from the CSE on the reverse voice channel is shown in FIG. 14b.

The CSE 208 returns to the voice mode of operation and the BSC 203 commences the normal handoff routine exercised in cellular systems. The BSC 203 also leaves its data modem on such that the presence of carrier tone at the land line terminal is not dropped. While the data terminals are in the cease transmission mode (X-off), the CSE monitors the characters in its buffer such that an "X-on" character does not appear until the handoff process is complete. Furthermore, the data stream is monitored for terminal generated X-off so that a handoff X-on is not generated to disturb the terminal communication process.

When the CSE 208 arrives at the reserved channel in the coverage area of BSC 202, it transponds SAT to BSC 202. A "handoff complete" message is sent to the cellular telephone exchange indicating a successful handoff. The cellular telephone exchange connects to the new CSE audio path. The original channel in the BSC 203 radio coverage area is released from service and made available to other CSE's. Returning to FIG. 13, the BSC 202 sends a local control order with digital color code at 1311 to cause the CSE 208 to prepare for the data mode format. The CSE 208 transfers to the data mode format and sends "X-on" at 1313 to resume data transmission provided no terminal generated X-off characters have been detected by the CSE.

If no channels are available at any of the adjacent cells, the BSC 203 leaves the voice/data channel in a data mode and continues to monitor the channel for adequate signal strength as well as a request to return to voice mode. After a predetermined interval, if the signal strength is still substandard, the BSC 203 will again request a data mode handoff. This process continues until the CSE 208 is handed off to another cell or the call is terminated.

If a source clear indication is not detected by BSC 203 but the CSE arrives on channel in the coverage area of BSC 202, signified by a "handoff complete" acknowledgement to the cellular telephone exchange, the handoff is deemed successful and no further action will take place. However, if a source clear is detected by BSC 203 but a "handoff comlete" fails to reach the cellular telephone exchange 201 from BSC 202, the CSE 208 is assumed to be lost and the cellular telephone exchange 201 sends a release to both BSC 203 and BSC 202. The handoff process can be further understood by referring to FIGS. 15a, 15b, 15c, and 15d which diagram handoff flow from the originating BSC (15a), to the cellular telephone exchange (15b), to the target BSC (15c), and to the CSE (15d).

If a radio signal loss occurs during the data mode, the BSC detects that the digital color code received from the CSE is no longer valid. The BSC begins timing for a period of time, 8 seconds in the preferred embodiment, while looking for a valid digital color code from the CSE. If a valid digital color code is received during the timing, the timing is stopped and the CSE is assumed to be back in radio contact. If the 8 second timer times out without a valid digital color code being received, than an RF-lost situation is assumed and the BSC sends a RF-lost indication to the cellular telephone exchange. At the cellular telephone exchange, norxal supervisory protocols will ensue to release the trunk. The BSC sends a release command in the data format to command the CSE to return to the voice mode. The BSC also turns off the data modem and sends a release order to the CSE over the forward voice channel instructing it to clear in conventional fashion from the voice channel.

If the modem connected to the PSTN loses the carrier tone from the land terminal a data carrier detect (DCD) loss is noted. This causes the BSC, in the preferred embodiment, to generate a control order indicating loss of DCD and to transmit the order to the CSE. Receipt of the control order causes the CSE to revert to the voice mode and may be used to indicate DCD loss to the CSE user.

To release the channel following a call disconnect, the cellular telephone exchange receives the disconnect from one of the connecting terminals. The cellular telephone exchange forwards a land release to the BSC which subsequently sends a command in data format to instruct the CSE to return to the voice mode. The BSC also turns off the data modem and sends a conventional release order to the CSE over the forward voice channel and normal channel clear procedures follow.

Figure 16:
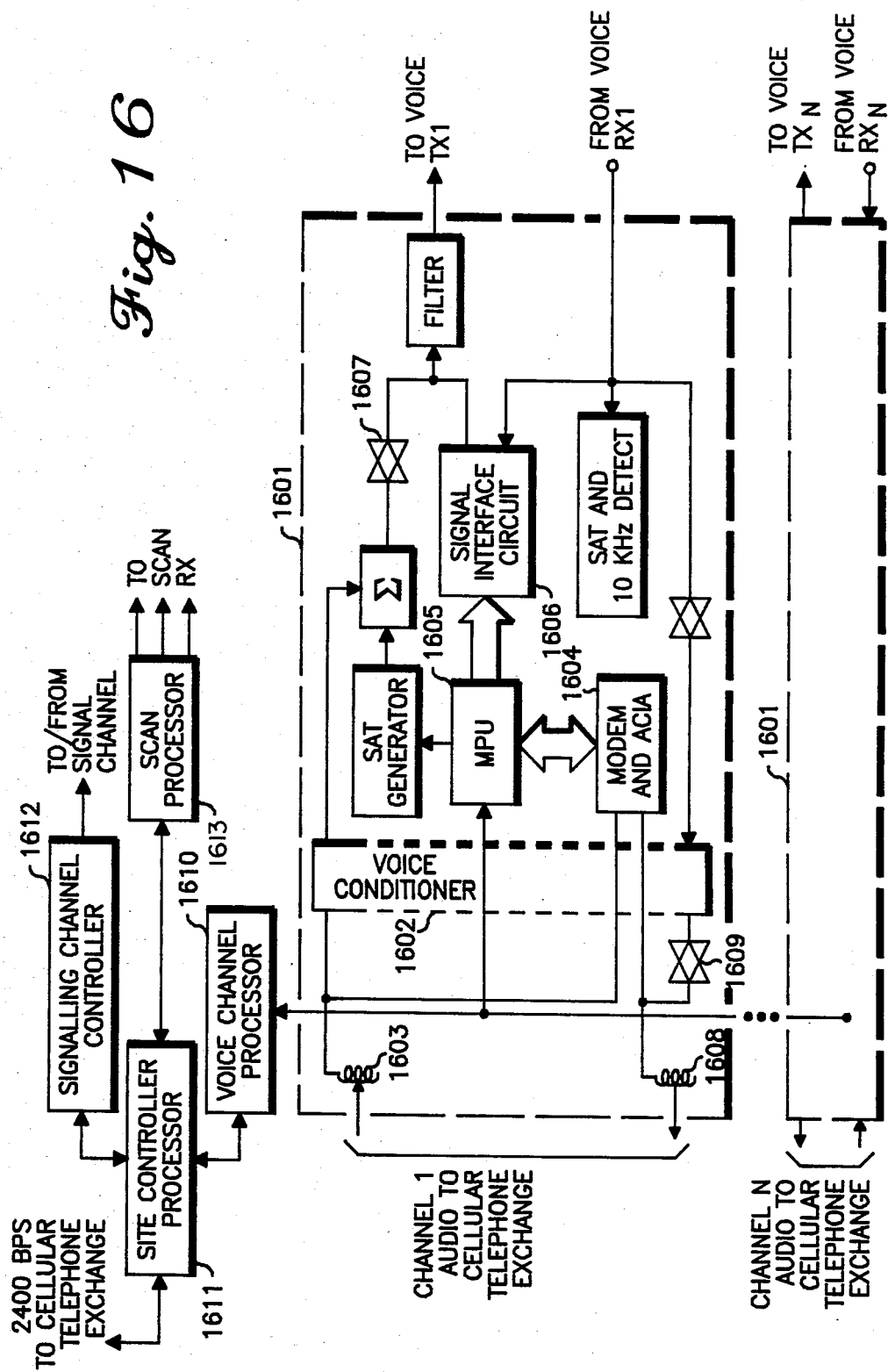
FIG. 16 is a block diagram of a base site controller incorporating part of the present invention.

In order to control the operation of a cell having the capacity for data channels, a base site controller (BSC) must be able to detect the previously described digital SAT and to encode and decode user generated data into and from the forward signalling channel data. Parity and start/stop bits must be added and removed from the data stream. Additionally, control commands must be inserted when required. These tasks are described for a BSC as follows and as shown in FIG. 16.

Each voice channel transceiver in the cell is connected to a dedicated audio conditioning circuit 1601 for each transceiver. In FIG. 16 there are N voice channels. Included in audio conditioning circuit 1601 is a voice conditioner 1602 which provides gain control and frequency response shaping for the audio transmit and receive frequencies of the channel. (This voice conditioner 1602 may be a TRN4498A Audio card marketed by Motorola Inc.). A data signal to be transmitted is received from the cellular telephone exchange via a standard hybrid transformer input and a conventional modem and asynchronous communications interface adaptor (ACIA) 1604 to microprocessor 1605 which may be an MC68HC11 or similar device. The data signal is converted to the previously described 10 KPBS forward signalling channel format including parity and busy-idle bits by the microprocessor 1605 and a signal interface circuit 1606 before being transmitted on a voice channel. Standard voice audio transmission is inhibited during data mode transmission by transmission gate 1607.

The received data is input to signal interface circuit 1606 and microprocessor 1605 where it is decoded by stripping busy idle bits and parity from the incoming signal, confirming digital SAT, performing error correction and majority voting on a repeated data signal, and outputting NRZ data. In a first implementation the output NRZ data is fed to the ACIA/modem 1604 where a conventional modem output is coupled to the telephone link to the cellular telephone exchange via hybrid transformer output winding 1608. Standard audio output is inhibited by transmission gate 1609.

If data transmission facilities between the BSC and the cellular telephone exchange exist, the modems may be located at the cellular telephone exchange and data rate converters or T carrier facilities may be located at the BSC to transmit the data between the BSC and cellular telephone exchange.

The audio conditioning circuits 1601 are preferably controlled by a voice channel processor 1610 (which may be a model TRN4541A available from Motorola Inc.). The principal functions of the voice channel processor 1610 are to control the base transceiver (not shown) associated with each audio conditioning circuit, to control the output of each audio conditioning circuit 1601, and to sense any alarm states generated by the RF equipment. Any commands from the site controller processor 1611 which affect the RF equipment or CSE are directed by the voice channel processor 1610 to the proper audio conditioning circuit 1601 tor encoding into the data stream or other action.

The site controller processor 1611 is a microprocessor based site control system, such as a TRN4542A marketed by Motorola Inc., which is capable of performing call processing function, higher order base station transceiver control, and communication with the cellular telephone exchange and other site controller processors of other cells. The site controller processor 1611 also directs the actions of a signalling channel controller 1612 and a scan processor 1613.

The signalling channel controller 1612 is a microprocessor-based circuit, such as a TRN4540A available from Motorola Inc., that is used to send paging and overhead information to CSE's on the forward signalling channel at the direction of the site controller processor 1611. The signalling channel controller 1612 also decodes and corrects data received from the CSE's on the reverse setup channel. It further determines both the signal strength and direction of signals coming from a CSE for the purpose of setting up a call.

A scan receiver processor 1613 is used to interface between the site controller processor 1611 and a scanning receiver (not shown) employed by the base station RF equipment. The scan receiver processor 1613 directs its associated scanning receiver to tune to a frequency and antenna determined by the site controller processor 1611 for either handoff or routine call quality check. The scanning receiver, in turn, provides the scan receiver processor 1613 both the demodulated received signal and the relative strength of this signal. A digital SAT detector, incorporated within the scan processor 1613, receives the demodulated received signal and selects the busy-idle bits from a scanned data signal. This is accomplished by a microprocessor circuit which may employ an MC68HC11 or similar microprocessor. The scan processor function may be realized by a TRN4593A which is marketed by Motorola Inc.

Figure 17:
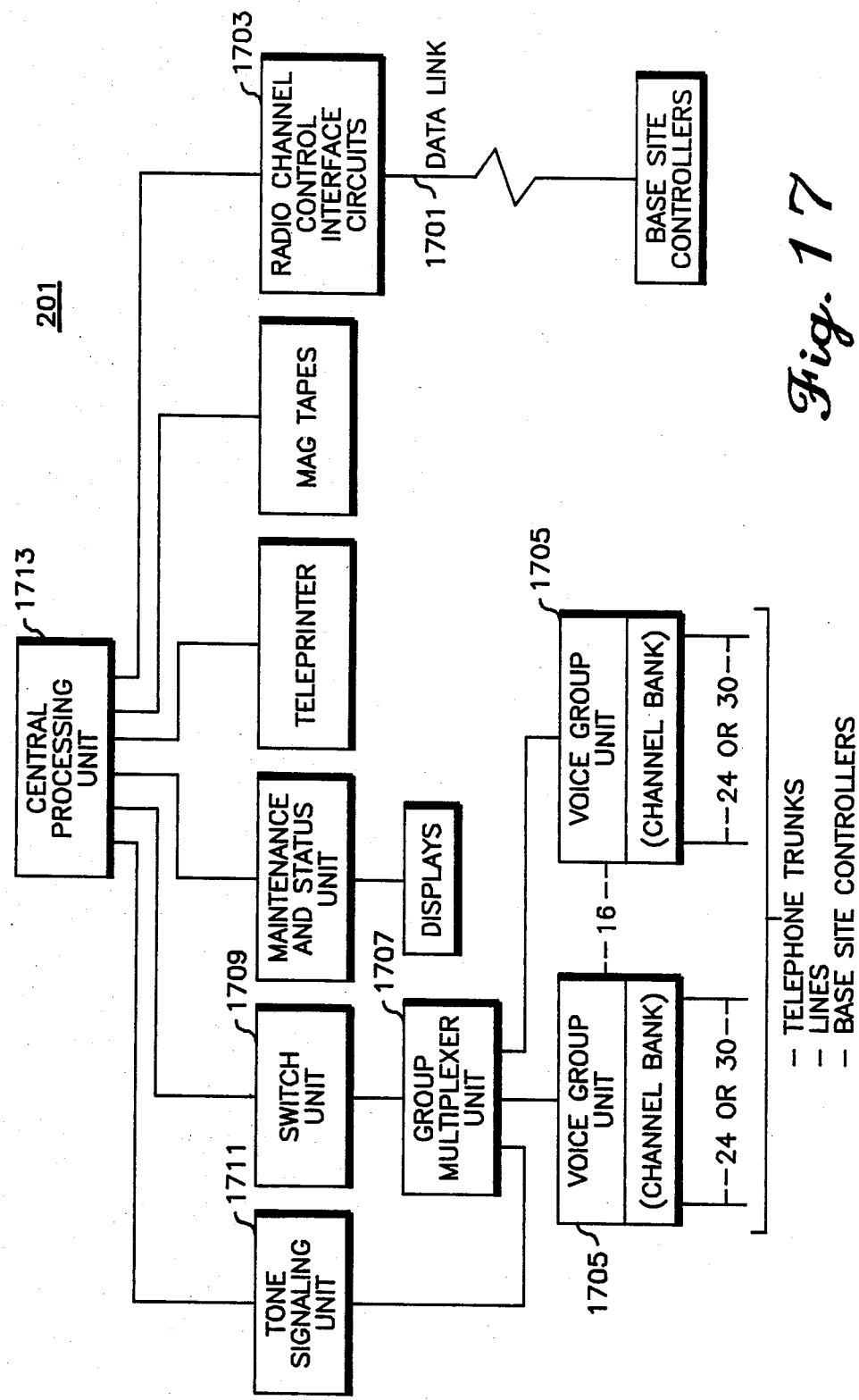
FIG. 17 Is a block diagram of a cellular telephone exchange.

The BSC's interface with a cellular telephone exchange is shown in FIG. 17. A cellular telephone exchange is further described in U.S. Pat. No. 4,268,722 assigned to the assignee of the present invention. The BSC interface is typically via a high speed data link, shown as 1701, to one of several radio channel control interface circuits 1703, which may be a TRN5509A manufactured by Motorola Inc. Communication between the base site controllers and the cellular telephone exchange, such as call origination requests, channel clear commands, and handoff processing, occur through the control interface circuits 1703. Operation of the cellular telephone exchange may be understood by briefly considering a typical radio telephone conversation. Audio from a CSE via a BSC enters the cellular telephone exchange from one of the telephone trunks input from a BSC to a voice group unit 1705 (which may be a TRN8926B available from Motorola Inc.) Each voice group unit 1705 may also interface with a device known as a channel bank which converts an analog signal input from a telephone trunk into a common pulse code modulated (PCM) digital stream. This PCM stream, which is one of 24 or 30 from each voice group unit depending upon the type of channel bank, is then input to a group multiplexer unit 1707, such as a TRN8927B available from Motorola Inc., in which the PCM streams from each voice group unit 1705 are combined. The combined stream is input to a time division switch unit 1709 (which can be a TRN8931B marketed by Motorola Inc. where one telephone trunk is connected to another via time slot switching which is well known in the art. Thus the CSE audio is connected to a second telephone trunk via the switch unit 1709, the group multiplexer 1707, and one of the voice group units 1705. Audio from this second trunk, which could be connected to the PSTN, follows the reverse path to the BSC and CSE. MF and DTMF tone generation and detection compatible with PSTN standards is accomplished in tone signalling unit 1711.

When the system is in the data mode, data signals generated at the CSE may be converted and transmitted to the BSC as described hereinbefore. The BSC provides a conventional modem to transmit the reconverted data from the BSC via a telephone trunk to the cellular telephone exchange and thence to a connected data terminal.

A second implementation, particularly useful when the trunks between BSC and cellular telephone exchange are digital trunks, places the conventional modems at the cellular telephone exchange. Cellular telephone data is reconverted to its original format and bit rate at the BSC and impressed upon one of the digital trunks for transmission to the cellular telephone exchange via T carrier. The voice group unit 1705 passes the input data to the group multiplexer 1707 and switch unit 1709. Output from the switch unit 1709 and group multiplexer 1707 can be to a modem bank (not shown) which takes the place of one, or more if required, voice group unit 1705. One conventional modem using two switch unit 1709 ports is provided per trunk and each modem is buffered from the data stream by a first-in first-out buffer capable of storing, in a preferred embodiment, two seconds of data bits. A second first-in first-out buffer is employed in each CSE.

The cellular telephone exchange is under control of a dual processor central processing unit 1713 which uses conventional dual microprocessors such as Z80B microprocessors manufactured by Zilog, Inc. or equivalent, arranged in a fashion such as that used in a TRN 8913B marketed by Motorola Inc.

Figure 18:
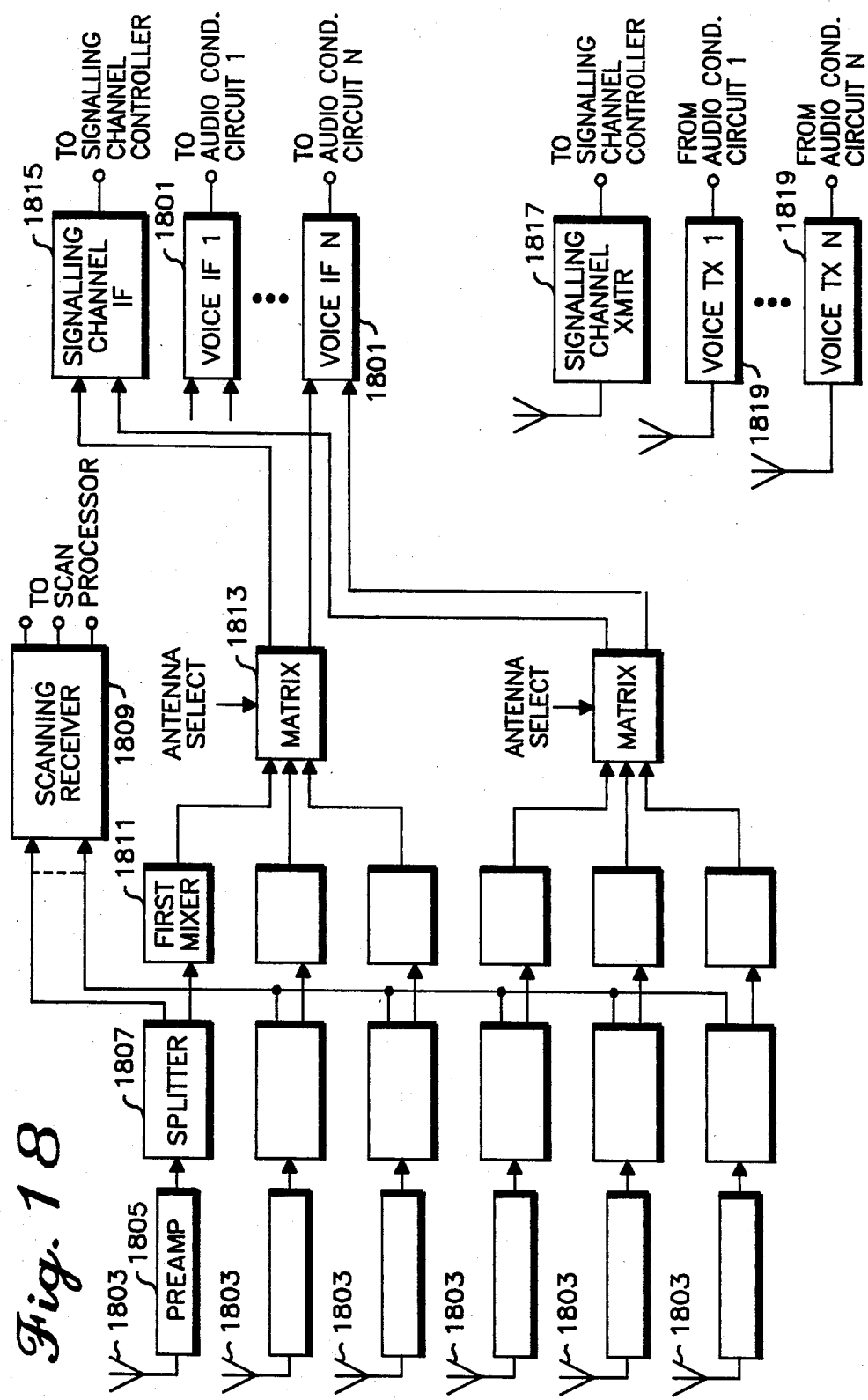
FIG. 18 is a block diagram of the base station transceivers employed in a cellular radiotelephone system.

Typical fixed radio equipment controlled by and connected to a BSC is shown in block diagram form in FIG. 18. Each voice IF 1801 is connected to an associated audio conditioning circuit 1601 for reception of data messages. A plurality of antennas 1803 provide space diversity reception of the radio carrier from a transmitting CSE (not shown). In a cellular configuration employing sector cells illuminated from a central site, these antennas may be directional antennas providing coverage primarily from one sector.

Considering one antenna receiver branch (which is identical to the other receiver branches), it can be seen that the received signal may be amplified and reduced in frequency in preamplifier 1805 before being split in splitter 1807. One output from splitter 1807 is coupled to the scanning receiver 1809 which samples the output of each splitter at a frequency determined by the scan processor 1613 to determine the antenna having the best received signal strength.

The other output from splitter 1807 is coupled to a first mixer 1811 where the signal is converted to an intermediate frequency (IF) in conventional fashion. The IF signal is coupled via IF line matrix 1813 to the appropriate voice IF 1801 where the signal is detected and passed to its audio conditioning circuit 1601. The IF line matrix 1813 also provides signals from each antenna to a signalling channel IF 1815 which detects signals being transmitted on the reverse set-up channel by CSE's.

Instructions from the signalling channel controller 1612 are transmitted on the forward set-up channel by conventional signalling channel transmitter 1817. The remainder of the transmitters at a fixed site are standard voice channel transmitters 1819 which transmit the data formatted in its associated audio conditioning circuit 1601.

While a particular embodiment of the system and equipment according to the invention has been shown and described, it should be understood that the invention is not limited thereto since many modifications may be made. It is therefore, contemplated to cover by the present application any and all such modifications that fall within the true spirit and scope of the basic underlying principles disclosed and claimed herein.

TABLE 1

| Sig Ch. | 333 | 332 | 331 | 330 | 329 | 328 | 327 | 326 | 325 | 324 | 323 | 322 | 321 | 320 | 319 | 318 | 317 | 316 | 315 | 314 | 313 |
|---|---|---|---|---|---|---|---|---|---|---|---|---|---|---|---|---|---|---|---|---|---|
| Voice | 312 | 311 | 310 | 309 | 308 | 307 | 306 | 305 | 304 | 303 | 302 | 301 | 300 | 299 | 298 | 297 | 296 | 295 | 294 | 293 | 292 |
|  | 291 | 290 | 289 | 288 | 287 | 286 | 285 | 284 | 283 | 282 | 281 | 280 | 279 | 278 | 277 | 276 | 275 | 274 | 273 | 272 | 271 |
|  | 270 | 269 | 268 | 267 | 266 | 265 | 264 | 263 | 262 | 261 | 260 | 259 | 258 | 257 | 256 | 255 | 254 | 253 | 252 | 251 | 250 |
|  | 249 | 248 | 247 | 246 | 245 | 244 | 243 | 242 | 241 | 240 | 239 | 238 | 237 | 236 | 235 | 234 | 233 | 232 | 231 | 230 | 229 |
|  | 228 | 227 | 226 | 225 | 224 | 223 | 222 | 221 | 220 | 219 | 218 | 217 | 216 | 215 | 214 | 213 | 212 | 211 | 210 | 209 | 208 |
|  | 207 | 206 | 205 | 204 | 203 | 202 | 201 | 200 | 199 | 198 | 197 | 196 | 195 | 194 | 193 | 192 | 191 | 190 | 189 | 188 | 187 |

TABLE 1-continued

| 186 | 185 | 184 | 183 | 182 | 181 | 180 | 179 | 178 | 177 | 176 | 175 | 174 | 173 | 172 | 171 | 170 | 169 | 168 | 167 | 166 |
|---|---|---|---|---|---|---|---|---|---|---|---|---|---|---|---|---|---|---|---|---|
| 165 | 164 | 163 | 162 | 161 | 160 | 159 | 158 | 157 | 156 | 155 | 154 | 153 | 152 | 151 | 150 | 149 | 148 | 147 | 146 | 145 |
| 144 | 143 | 142 | 141 | 140 | 139 | 138 | 137 | 136 | 135 | 134 | 133 | 132 | 131 | 130 | 129 | 128 | 127 | 126 | 125 | 124 |
| 123 | 122 | 121 | 120 | 119 | 118 | 117 | 116 | 115 | 114 | 113 | 112 | 111 | 110 | 109 | 108 | 107 | 106 | 105 | 104 | 103 |
| 102 | 101 | 100 | 99 | 98 | 97 | 96 | 95 | 94 | 93 | 92 | 91 | 90 | 89 | 88 | 87 | 86 | 85 | 84 | 83 | 82 |
| 81 | 80 | 79 | 78 | 77 | 76 | 75 | 74 | 73 | 72 | 71 | 70 | 69 | 68 | 67 | 66 | 65 | 64 | 63 | 62 | 61 |
| 60 | 59 | 58 | 57 | 56 | 55 | 54 | 53 | 52 | 51 | 50 | 49 | 48 | 47 | 46 | 45 | 44 | 43 | 42 | 41 | 40 |
| 39 | 38 | 37 | 36 | 35 | 34 | 33 | 32 | 31 | 30 | 29 | 28 | 27 | 26 | 25 | 24 | 23 | 22 | 21 | 20 | 19 |
| 18 | 17 | 16 | 15 | 14 | 13 | 12 | 11 | 10 | 9 | 8 | 7 | 6 | 5 | 4 | 3 | 2 | 1 | 0 | 0 | 0 |

TABLE 2

| | # BITS/ WORD | REPEAT/ WORD | TOTAL/ WORD |
|---|---|---|---|
| BIT SYNC | 10 | 1 | 10 |
| WORD SYNC | 11 | 1 | 11 |
| WORD CONTROL | 7 | 5 | 35 |
| CHARACTERS | 49 | 5 | 245 |
| BCH PARITY | 24 | 5 | 120 |
| BUSY/IDLE | 8 | 5 (+2) | 42 |
| | | | 463 BITS/ WORD |

TABLE 3

| | # BITS/ FRAME | REPEAT/ WORD | TOTAL/ WORD |
|---|---|---|---|
| BIT SYNC | 10 | 1 | 10 |
| WORD SYNC | 11 | 1 | 11 |
| WORD CONTROL | 8 | 5 | 40 |
| CHARACTERS | 48 | 5 | 240 |
| BCH PARITY | 24 | 5 | 120 |
| BUSY/IDLE | 8 | 5 (+2) | 42 |
| | | | 463 BITS/ WORD |

We claim:

1. A radiotelephone data message transmission system for communicating data message via radio channels between remote subscriber stations and fixed site stations comprising:
   means for accepting a data message in a first format and for converting said first format to a second format;
   means for transmitting said data message in said second format on a first radio channel;
   means for receiving and reconverting said second format data message to said first format data message;
   means for generating a command to cease transmission of said data message;
   means for ceasing transmission of said data message upon receiving a command so instructing; and
   means for changing transmission from said first radio channel to a second radio channel and for commencing and transmitting said data message in said second format on said second radio channel thereby realizing a handoff.

2. A data message transmission system in accordance with claim 1 wherein said second format further comprises at least one data word preceeded by a predetermined bit pattern bit synchronization and a predetermined bit pattern word synchronization.

3. A data message transmission system in accordance with claim 2 wherein said second format data word further comprises a plurality of data bits comprising a control field, at least one character field for transmission of data, and a parity field.

4. A data message transmission system in accordance with claim 1 wherein said message transmission system further comprises means for generating a plurality of control bits interspersed at predetermined intervals within said second format data message.

5. A data message transmission system in accordance with claim 4 wherein said plurality of control bits are employed as a digital supervisory signal.

6. A data message transmission system in accordance with claim 1 wherein said data message transmission ceasing command further comprises a handoff imminent command and an X-off command.

7. A data message transmission system in accordance with claim 6 wherein said handoff imminent command is generated by the fixed site stations and the X-off command is generated by the remote subscriber stations.

8. A cellular radiotelephone system communicating data messages via radio channels between a plurality of remote subscriber stations having data terminals and at least one fixed site station connected to data terminals comprising:
   means for requesting data mode service by one of the remote subscriber stations;
   means for assigning a data radio channel to said requesting remote subscriber station and for communicating said assignment to said requesting remote subscriber station;
   means, at said requesting remote subscriber station, for acknowledging said assignment and responsively entering a data mode for transmission of a data message on said assigned data radio channel;
   means for converting the format of said data message to a radio channel format at said requesting remote subscriber station before transmission of said data message and for reconversion of said radio channel format to said data message format following reception of said message at the fixed site station; and
   means for monitoring at the fixed site station said data message for predetermined data bits identifying a particular fixed site station.

9. A cellular radiotelephone system in accordance with claim 8 wherein said cellular radiotelephone system further comprises means for effecting a handoff of said remote subscriber station.

10. A cellular radiotelephone system in accordance with claim 9 wherein said means for effecting a handoff further comprises means for transmitting a handoff imminent command from the fixed site station.

11. A cellular radiotelephone system in accordance with claim 10 wherein said means for effecting a handoff further comprises means, responsive to said handoff imminent command received at said remote subscriber station, for generating and conveying an X-off signal to data terminals communicating on said assigned data radio channel.

12. A cellular radiotelephone system in accordance with claim 11 wherein said means for effecting a handoff further comprises means for detecting a lack of data transmitted by said communicating data terminals and for transmitting an acknowledge signal thereby initiating handoff.

13. A cellular radiotelephone system in accordance with claim 12 wherein said data message transmitting subscriber station further comprises means for leaving said data mode following said acknowledge signal and for resuming data mode and transmitting an X-on command following handoff completion.

14. A cellular radiotelephone system in accordance with claim 8 wherein said radio channel format further comprises at least one data word preceeded by a bit synchronization of a predetermined pattern of bits and a word synchronization of a predetermined pattern of bits.

15. A cellular radiotelephone system in accordance with claim 14 wherein said radio channel format data word further comprises a plurality of data bits comprising a control field, at least one character field for transmission of message data, and a parity field.

16. A cellular radiotelephone system in accordance with claim 15 wherein said data word is repeated a predetermined number of times within said radio channel format.

17. A cellular radiotelephone system communicating data messages and handoff commands via radio channels between a plurality of remote subscriber stations having data terminals and a network of fixed site stations connected to data terminals comprising:
   means for transmitting a handoff imminent command on a first radio channel from a first fixed site station to a remote subscriber station communicating a data message between first and second data terminals on said first radio channel;
   means for generating a signal for said first and second data terminals in response to said handoff imminent command thereby halting data communications between said first and second data terminals;
   means for detecting a lack of data transmitted by said first and second data terminals and for transmitting an acknowledge signal thereby initiating handoff; and
   means for changing from said first radio channel to a second radio channel of a second fixed site station and resuming data communication on said second radio channel thereby completing handoff.

18. A cellular radiotelephone system in accordance with claim 17 wherein a remote subscriber station further comprises means for requesting data service from the fixed site stations.

19. A cellular radiotelephone system in accordance with claim 18 wherein each fixed site station further comprises means for receiving said remote subscriber station request, assigning a data radio channel to said remote subscriber station, and communicating said assignment to said requesting remote subscriber station.

20. A cellular radiotelephone system in accordance with claim 19 wherein said requesting remote subscriber station further comprises means for acknowledging said channel assignment and responsively entering a data mode for the transmission of a data message.

21. A cellular radiotelephone system in accordance with claim 17 wherein said cellular radiotelephone system further comprises means for accepting a data message in a first format and for converting said first format to a second format.

22. A cellular radiotelephone system in accordance with claim 21 wherein said second format comprises at least one data word preceeded by a bit synchronization of a predetermined pattern of bits and a word synchronization of a predetermined pattern of bits.

23. A cellular radiotelephone system in accordance with claim 21 wherein said second format further comprises a plurality of control data bits interspersed at predetermined intervals within said format.

24. A cellular radiotelephone system in accordance with claim 23 wherein said plurality of data bits are employed as a digital supervisory signal.

25. A data message communications system for a cellular radiotelephone system including a frame of data words preceeded by a predetermined bit pattern bit synchronization and a predetermined bit pattern word synchronization, each frame comprising:
   a first data word having a plurality of data bits comprising a control field, at least one character field for transmission of message data, and a parity field essentially developed, according to a predetermined code, from the bits of said control and character fields in said first data word;
   a second data word of a plurality of data bits comprising at least one character field for transmission of message data and a parity field essentially developed, according to said predetermined code, from the bits of said character field of said second data word; and
   a plurality of control bits interspersed at predetermined intervals with said data bits of said first and second data words.

26. A data message communications system in accordance with claim 25 wherein said first data word and said second data word are concatenated thereby forming a data word pair.

27. A data message communications system in accordance with claim 26 wherein said data word pair is repeated for the duration of the frame.

28. A data message communications system in accordance with claim 25 wherein said frame contains five two data word pairs.

29. A data message communications system in accordance with claim 25 wherein said first data word control field further comprises a contents defining field, an identification field, and a character count field.

30. A data message communications system in accordance with claim 25 wherein said plurality of control bits are employed as a digital supervisory signal.

31. A data message communications system in accordance with claim 30 wherein said plurality of control bits are interspersed at an interval of 10 data word bits between control bits.

32. A data message communications system in accordance with claim 31 wherein each control bit in said first data word is of identical binary value and each control bit in said second data word is of identical binary value.

33. A data message communications system in accordance with claim 25 wherein each character field comprises seven data bits thereby maintaining compatibility with ASCII character codes.

34. A data message communications system in accordance with claim 25 wherein each character field comprises eight data bits thereby maintaining compatibility with extended ASCII codes.

35. A data message communications system in accordance with claim 25 wherein at least one character field contains a command instruction.

36. A data message communications system in accordance with claim 25 wherein said character fields contain null characters, a predetermined number of which enable handoff.

37. A method of communicating data messages via radio channesl between remote subscriber stations and fixed site stations in a radiotelephone system comprising the steps of:
accepting a data message in a first format and converting said first format to a second format;
transmitting said data message in said second data format on a first radio channel;
receiving and reconverting said second format data message to said first format data message;
generating a command to cease transmission of said data message;
ceasing transmission of said data message in said second data format upon detecting said generated command; and
changing transmission from said first radio channel to a second radio channel, and commencing and transmitting said data message in said second data format on said second radio channel thereby realizing a handoff.

38. A method in accordance with the method of claim 37 further comprising the step of interspersing control data bits at predetermined intervals in said second data format thereby providing a digital supervisory signal imbedded in said second data format.

39. A method of communicating data messages via radio channels in a cellular radiotelephone system between a plurality of remote subscriber stations having data terminals and at least one fixed site station connected to data terminals comprising the steps of:
requesting data mode service by one of the remote subscriber stations;
granting said data mode service to said requesting remote subscriber station;
acknowledging said grant and entering said data mode with said requesting remote subscriber station for transmission of a data message on a data radio channel;
converting the format of said data message into a radio channel format at said requesting remote subscriber station before transmission of said data message and reconverting said radio channel format to said data message format following reception of said message at the fixed site station; and
monitoring said data message at the fixed site station for predetermined data bits identifying a particular fixed site station.

40. A method in accordance with the method of claim 39 wherein said method further comprises the step of effecting a handoff of said remote subscriber station.

41. A method in accordance with the method of claim 40 wherein said handoff effecting step further comprises the step of transmitting a handoff imminent command from the fixed site station.

42. A method in accordance with the method of claim 41 wherein said handoff effecting step further comprises the steps of generating and conveying an X-off signal to data terminals communicating on said assigned data radio channel from said remote subscriber station in response to said handoff imminent command reception.

43. A method in accordance with the method of claim 42 wherein said handoff effecting step further comprises the step of detecting a lack of data transmitted by said communicating data terminals and transmitting an acknowledge signal thereby initiating handoff.

44. A method in accordance with the method of claim 43 wherein said handoff effecting step further comprises the steps of leaving said data mode following said acknowledge signal and for resuming data mode by transmitting an X-on signal to said communicating data terminals following handoff.

45. A method in accordance with the method of claim 39 further comprising the steps of determining if said requesting remote subscriber station is communicating on a radio channel equipped for data communication and for handing-off said requesting remote subscriber station if it is not on a data communication equipped channel.

46. A method in accordance with the method of claim 39 further comprising the step of determining if a radio channel equipped for data communication is available.

47. A method in accordance with the method of claim 46 further comprising the step of transmitting a command denying said data mode service request if a radio channel equipped for data communication is not available.

48. A method in accordance with the method of claim 39 further comprising the steps of starting a timer in said requesting remote subscriber station after said data mode service request and for requesting data mode service again if a predetermined time period passes without said radio channel assignment being received.

49. A method in a accordance with the method of claim 39 further comprising the step of removing standard SAT tone from the fixed site transmissions to said requesting remote subscriber station.

50. A method in accordance with the method of claim 49 further comprising the step of conveying an X-on command to the data terminals communicating via said requesting remote subscriber station.

51. A method of communicating data messages and effecting handoff via a radio channel in a cellular radiotelephone system between a plurality of remote subscriber stations having data terminals and a network of fixed site stations connected with to data terminals comprising the steps of:
transmitting a handoff imminent command on a first radio channel from a first fixed station to a remote subscriber station communicating a data message between first and second data terminals on said first radio channel;
generating a signal for said first and second data terminals in response to said handoff imminent command, thereby halting data communications between said first and second data terminals;
detecting a lack of data transmitted by said first and second data terminals and transmitting an acknowledge signal thereby initiating handoff; and
changing from said first radio channel to a second radio channel of a second fixed site, and resuming data communication on said second radio channel thereby completing handoff.

52. A method in accordance with the method of claim 51 wherein said method further comprises the step of requesting data mode service from a fixed site station by a remote subscriber station.

53. A method in accordance with the method of claim 52 wherein said method further comprises the steps of receiving said request, assigning a data radio channel to the requesting remote subscriber station, and communicating said assignment to said requesting remote subscriber station.

54. A method in accordance with the method of claim 53 wherein said method further comprises the steps of acknowledging said channel assignment and entering data mode for the transmission of a data message.

55. A method in accordance with the method of claim 51 further comprising the step of switching from a data communication mode of operation to a radiotelephone mode of operation at said communicating remote subscriber station following said acknowledge signal transmission.

56. A method in accordance with the method of claim 55 wherein said step of resuming data communication further comprises the steps of:
 transmitting a data mode resumption command on said second radio channel from said second fixed site;
 switching from a radiotelephone mode of operation to a data communications mode of operation at said communicating remote subscriber station in response to said data mode resumption command; and
 generating an on signals for said first and second data terminals.

57. A radio data message transmission system for communicating data messages via radio channels between remote subscriber stations and fixed site stations comprising:
 means for accepting a data message in a first format and for converting said first format to a second format;
 means for transmitting said data message in said second format on a first radio channel;
 means for ceasing transmission of said data message and for changing transmission from said first radio channel to a second radio channel; and
 means for commencing and transmitting said data message in said second format on said second radio channel thereby realizing a handoff.

58. A data message system in accordance with claim 57 wherein said means for ceasing transmission further comprises means for generating a command to cease transmission of said data message and inserting said command into said second format data message.

59. A data message system in accordance with claim 58 wherein said data message transmission ceasing command further comprises a handoff imminent command and an X-off command.

60. A data message system in accordance with claim 59 wherein said handoff imminent command is generated by a fixed site station and the X-off command is generated by a remote subscriber station.

61. A method of communicating data messages via radio channels between remote subscriber stations and fixed site stations in a radio system, comprising the steps of:
 accepting a data message in a first format and converting said first format to a second format;
 transmitting said data message in said second data format on a first radio channel;
 ceasing transmission of said data message in said second data format and changing transmission from said first radio channel to a second radio channel; and
 commencing and transmitting said data message in said second data format on said second radio channel thereby realizing a handoff.

62. A method in accordance with the method of claim 61 wherein said ceasing transmission step further comprises the steps of generating a command to cease transmission of said data message and inserting said command into said second format data message.

63. A method in accordance with the method of claim 62 wherein said data message transmission ceasing command generation step further comprises the step of generating a handoff imminent command and an X-off command.

* * * * *

UNITED STATES PATENT AND TRADEMARK OFFICE
CERTIFICATE OF CORRECTION

PATENT NO. : 4,654,867
DATED : March 31, 1987
INVENTOR(S) : Gerald P. Labedz et al It is certified that error appears in the above-identified patent and that said Letters Patent is hereby corrected as shown below:

On the title page inventors should read

--(75) Inventors: Gerald P. Labedz, Chicago; Jeffrey D. Bonta, Mount Prospect; Dennis R. Schaeffer, Buffalo Grove; Daniel F. Tell, Deerfield; Valy Lev, Schaumburg, all of Ill.--

Signed and Sealed this

Twelfth Day of April, 1988

*Attest:*

DONALD J. QUIGG

*Attesting Officer*  *Commissioner of Patents and Trademarks*